US009406008B2

(12) United States Patent
Tajima

(10) Patent No.: US 9,406,008 B2
(45) Date of Patent: Aug. 2, 2016

(54) IMAGE FORMING APPARATUS, IMAGE FORMING SYSTEM, AND IMAGE FORMING METHOD

(71) Applicant: FUJI XEROX CO., LTD., Tokyo (JP)

(72) Inventor: Shingo Tajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/598,304

(22) Filed: Jan. 16, 2015

(65) Prior Publication Data

US 2016/0086069 A1 Mar. 24, 2016

(30) Foreign Application Priority Data

Sep. 24, 2014 (JP) ................................. 2014-193393

(51) Int. Cl.
*G06F 11/34* (2006.01)
*G06K 15/00* (2006.01)

(52) U.S. Cl.
CPC .................................. *G06K 15/408* (2013.01)

(58) Field of Classification Search
CPC ... G06K 15/408; G06F 3/1234; G06F 3/1225; G06F 3/1224; G06F 3/1229; G06F 3/123; G06F 3/1259; G06F 3/126; G06F 3/1273; G06F 3/1293; G06F 3/1294; G06F 3/1296; G06F 8/65; G06F 8/66; G06F 8/665; G06F 8/68; G06F 11/0766; G06F 11/1433; H04N 1/00002; H04N 1/00029; H04N 1/00037; H04N 1/00053; H04N 1/00066; H04N 1/00084; H04N 1/00087; H04N 1/00962; G03G 15/55; G03G 15/553; G03G 15/5045
USPC .......... 358/1.1, 1.9, 2.1, 1.11–1.18, 400–404; 399/9, 11–13, 16–22, 24, 29; 717/168–178
See application file for complete search history.

(56) References Cited

U.S. PATENT DOCUMENTS

| | | | | |
|---|---|---|---|---|
| 2009/0161143 A1* | 6/2009 | Nakamoto | .......... | G06F 11/1433 358/1.14 |
| 2012/0209977 A1* | 8/2012 | Nakajo | ..................... | G06F 8/65 709/223 |

FOREIGN PATENT DOCUMENTS

| | | | |
|---|---|---|---|
| JP | 2003-264648 A | | 9/2003 |
| JP | 2003264648 A | * | 9/2003 |
| JP | 2010-128581 A | | 6/2010 |
| JP | 2010128581 A | * | 6/2010 |

* cited by examiner

*Primary Examiner* — Chad Dickerson
(74) *Attorney, Agent, or Firm* — Sughrue Mion, PLLC

(57) ABSTRACT

An image forming apparatus includes an operation estimation unit, a calculation unit, and a control unit. The operation estimation unit estimates an amount of operation from an operation history of an apparatus. The calculation unit calculates a degree of environmental deterioration of an internal environment of the apparatus caused when an update is performed for the apparatus. The control unit sets an inappropriate time frame or an appropriate time frame for the update using the amount of operation and the degree of environmental deterioration.

11 Claims, 18 Drawing Sheets

FIG. 10

| START DATE AND TIME | UPDATE TARGET | SIZE OF UPDATE MODULE | UPDATE TIME PERIOD | REBOOT TIME PERIOD |
|---|---|---|---|---|
| OCT. 12, 2103 - 6:15:22 P.M. | DRYER HEATER CONTROL FIRMWARE | 125 MB | 10 MINUTES | 5 MINUTES (PARTIAL REBOOT) |
| DEC. 20, 2013 - 8:05:21 P.M. | INK HEATER CONTROL FIRMWARE | 205 MB | 25 MINUTES | 20 MINUTES (ENTIRE REBOOT) |
| JAN. 25, 2014 - 7:32:05 A.M. | HUMIDIFIER FIRMWARE | 30 MB | 5 MINUTES | 5 MINUTES (PARTIAL REBOOT) |

FIG. 11

| UPDATE TARGET | SIZE OF UPDATE MODULE | UPDATE TIME PERIOD | REBOOT TIME PERIOD |
|---|---|---|---|
| INK HEATER CONTROL FIRMWARE | 350 MB | 37 MINUTES | 20 MINUTES (ENTIRE REBOOT) |
| HEAD NOZZLE HEATER CONTROL FIRMWARE | 500 MB | 50 MINUTES e.g. CONVERSION 10 MB = 1 MINUTE | 20 MINUTES (ENTIRE REBOOT) |

FIG. 13

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| PV | 0 | 0 | 0 | 0 | 0 | 0 | 0 | 2 | 4 | 5 | 5 | 4 | 0 | 1 | 5 | 5 | 5 | 3 | 2 | 1 | 1 | 0 | 0 | 0 |
| TEMPERATURE | 3 | 4 | 4 | 4 | 5 | 5 | 5 | 4 | 3 | 2 | 1 | 0 | 0 | 0 | 0 | 0 | 1 | 2 | 3 | 3 | 3 | 3 | 3 | 4 |
| HUMIDITY | 1 | 1 | 1 | 0 | 0 | 0 | 1 | 2 | 3 | 4 | 4 | 5 | 5 | 5 | 5 | 4 | 3 | 2 | 1 | 1 | 1 | 0 | 0 | 0 |
| INAPPROPRIATENESS INDEX | 4 | 5 | 5 | 4 | 5 | 5 | 6 | 6 | 10 | 11 | 10 | 9 | 5 | 6 | 10 | 9 | 9 | 7 | 6 | 5 | 5 | 4 | 4 | 4 |

FIG. 16

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| PV | 3 | 3 | 3 | 4 | 5 | 4 | 5 | 4 | 4 | 5 | 5 | 4 | 3 | 4 | 5 | 5 | 5 | 4 | 4 | 3 | 3 | 5 | 4 | 5 |
| TEMPERATURE | 3 | 4 | 4 | 4 | 5 | 5 | 5 | 4 | 3 | 2 | 1 | 0 | 0 | 0 | 0 | 0 | 1 | 2 | 3 | 3 | 3 | 3 | 3 | 4 |
| HUMIDITY | 1 | 1 | 1 | 0 | 0 | 0 | 1 | 2 | 3 | 4 | 4 | 5 | 5 | 5 | 5 | 4 | 3 | 2 | 1 | 1 | 1 | 0 | 0 | 0 |
| INAPPROPRIATENESS INDEX | 7 | 8 | 8 | 8 | 10 | 9 | 11 | 10 | 10 | 11 | 10 | 9 | 8 | 9 | 10 | 9 | 9 | 8 | 8 | 7 | 7 | 8 | 7 | 9 |

FIG. 20

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| PV | 0 | 0 | 0 | 0 | 0 | 0 | 0 | 2 | 4 | 5 | 5 | 4 | 0 | 1 | 5 | 5 | 5 | 3 | 2 | 1 | 1 | 0 | 0 | 0 |
| TEMPERATURE | 3 | 4 | 4 | 4 | 5 | 5 | 5 | 4 | 3 | 2 | 1 | 0 | 0 | 0 | 0 | 0 | 1 | 2 | 3 | 3 | 3 | 3 | 3 | 4 |
| HUMIDITY | 1 | 1 | 1 | 0 | 0 | 0 | 1 | 2 | 3 | 4 | 4 | 5 | 5 | 5 | 5 | 4 | 3 | 2 | 1 | 1 | 1 | 0 | 0 | 0 |
| INSTANTANEOUS INTERRUPTION | 0 | 1 | 1 | 1 | 2 | 2 | 2 | 4 | 2 | 8 | 2 | 2 | 1 | 10 | 4 | 6 | 5 | 1 | 2 | 1 | 2 | 2 | 1 | 1 |
| INAPPROPRIATENESS INDEX | 4 | 6 | 6 | 5 | 7 | 7 | 8 | 12 | 12 | 19 | 12 | 11 | 6 | 16 | 14 | 15 | 14 | 8 | 8 | 6 | 7 | 5 | 4 | 5 |

IMAGE FORMING APPARATUS, IMAGE FORMING SYSTEM, AND IMAGE FORMING METHOD

CROSS-REFERENCE TO RELATED APPLICATIONS

This application is based on and claims priority under 35 USC 119 from Japanese Patent Application No. 2014-193393 filed Sep. 24, 2014.

BACKGROUND (i) Technical Field

The present invention relates to an image forming apparatus, an image forming system, and an image forming method.

(ii) Related Art

With an increase in globalization, there are more and more cases where printers and controllers are installed in various counties or regions, and the need is increasing for taking environmental characteristics of various regions including extremely cold regions, dry regions, hot-and-humid regions, and dusty regions into consideration. In addition, since ink-jet printers and the like are relatively sensitive to low temperatures and dryness. Preferably, an ink-jet printer is operated in an environment in which the temperature and the humidity are kept at a certain level; however, there is no guarantee that such conditions are satisfied depending on the countries or regions and it is necessary to control the internal environment of a printer in accordance with the external environment around the printer in order to maintain a certain quality level.

In terms of quality control, an update is performed for applying a patch with which bugs found after a product release may be corrected; however, it requires a certain time period to perform an update, and thus there is an issue as to at which timing an update is to be performed.

Even when an update is performed by estimating a time period during which a system is idle or determining an idle state, there may be the case where the timing at which the update is performed is not always an appropriate timing. That is, when an update is performed for a control unit of a system, control of the internal environment of the system also enters an idle state. Thus, in the case where the external environment of the system is not preferable for the system, the internal environment may be affected by the external environment and become deteriorated. In the case where the internal environment of the system has deteriorated, it ends up requiring an extra time until the internal environment recovers to a certain range set initially.

SUMMARY

According to an aspect of the invention, there is provided an image forming apparatus including an operation estimation unit, a calculation unit, and a control unit. The operation estimation unit estimates an amount of operation from an operation history of an apparatus. The calculation unit calculates a degree of environmental deterioration of an internal environment of the apparatus caused when an update is performed for the apparatus. The control unit sets an inappropriate time frame or an appropriate time frame for the update using the amount of operation and the degree of environmental deterioration.

BRIEF DESCRIPTION OF THE DRAWINGS

An exemplary embodiment of the present invention will be described in detail based on the following figures, wherein:

FIG. 10 is a diagram illustrating an example of an update history;

FIG. 11 is a diagram illustrating an example of an estimated time period for performing an update;

FIG. 13 is a diagram illustrating an update inappropriateness index;

FIG. 16 is a diagram illustrating an update inappropriateness index;

FIG. 20 is a diagram illustrating an update inappropriateness index.

DETAILED DESCRIPTION

In the following, an exemplary embodiment of the present invention will be described with reference to the drawings.

Figure 1:
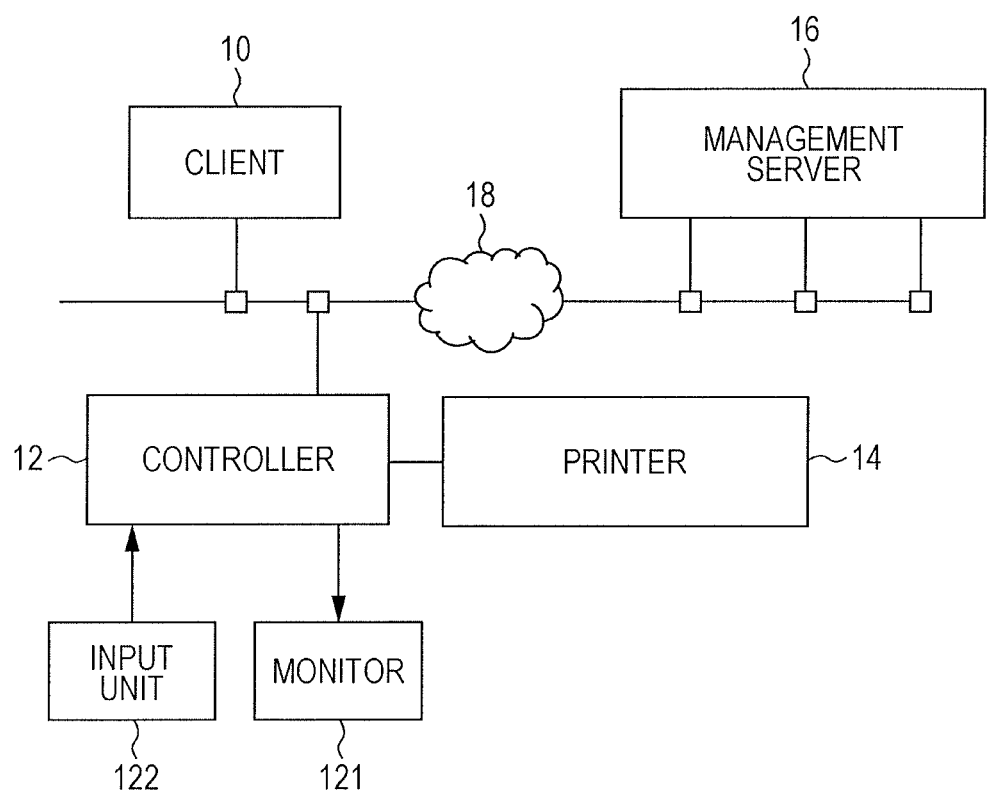
FIG. 1 is a system configuration diagram of an exemplary embodiment.

FIG. 1 is a diagram illustrating an overall configuration of an image forming system of the exemplary embodiment. The image forming system includes a client (a client computer) 10, a controller 12, a printer 14, and a management server (a management server computer) 16.

The client 10 is connected to the controller 12 via a local-area network (LAN), and outputs various types of commands including a print command and the like to the controller 12 in accordance with a user operation.

The controller 12 is connected to the printer 14 and controls an operation of the printer 14. The controller 12 receives various types of commands from the client 10 via the LAN and controls an operation of the printer 14 in accordance with a certain command. A monitor 121, which outputs and displays various types of information, and an input unit 122, which is used to input various types of information including an update command for the printer 14, are connected to the controller 12. The controller 12, the monitor 121, and the input unit 122 serve as an image forming apparatus that controls the printer 14.

The printer 14 is, for example, an ink-jet printer capable of printing a number of pages of documents, and outputs and prints documents under control performed by the controller 12.

The management server 16 is connected to the client 10 and the controller 12 via the Internet 18, and stores an operation history of the printer 14 and an environment change history of the printer 14 and performs management.

The operation history of the printer 14 is about, for example, the number of pages printed in every unit time, and the environment change history of the printer 14 is about, for example, the temperature, the humidity, and the like around the printer 14 in every unit time. These data are detected by the controller 12, and the management server 16 stores and manages these data transmitted from the controller 12. In addition, the management server 16 manages an update for a control program for the printer 14, and manages especially a certain timing at which the update is to be performed. That is, for an update for the printer 14, a person in charge of maintenance of the printer 14 basically determines a certain timing at which the update is to be performed and the update is performed by installing an update module provided from the management server 16 into the printer 14 using the controller 12. In the exemplary embodiment, the management server 16 determines a time frame inappropriate for performing an update in accordance with the operation history of the printer 14 and an environment change, and supplies information on the determined inappropriate time frame to the controller 12.

Figure 2:
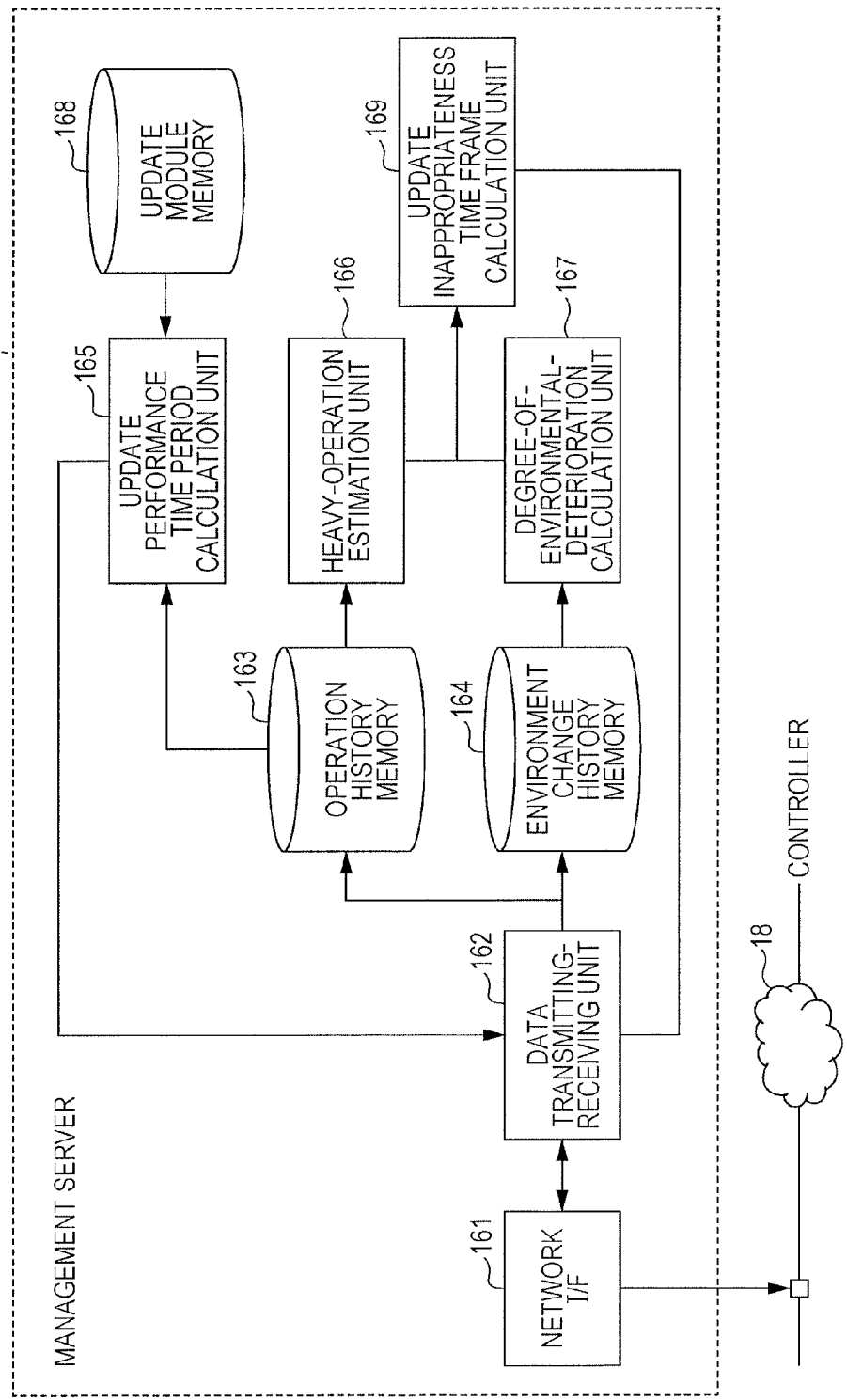
FIG. 2 is a configuration diagram of a management server.

FIG. 2 is a functional block diagram of the management server 16. The management server 16 includes a network interface (I/F) 161, a data transmitting-receiving unit 162, an operation history memory 163, an environment change history memory 164, an update performance time period calculation unit 165, a heavy-operation estimation unit 166, a degree-of-environmental-deterioration calculation unit 167, an update module memory 168, and an update inappropriateness time frame calculation unit 169.

The data transmitting-receiving unit 162 transmits and receives various types of data to and from the controller 12 via the network I/F 161.

The operation history memory 163 stores pieces of operation history data of the printer 14 transmitted from the controller 12 successively.

The environment change history memory 164 stores pieces of external environment change history data of the printer 14 transmitted from the controller 12 successively.

The update performance time period calculation unit 165 calculates an estimated time period, which is considered to be a time period to be required for performing an update, in accordance with a certain history stored in the operation history memory 163 and an update module stored in the update module memory 168. More specifically, in the case where an update module for the printer 14 is present, which is to be updated, the update performance time period calculation unit 165 calculates an estimated time period to be required for performing an update this time in accordance with the data size of the update module and a certain update history for the printer 14. The update performance time period calculation unit 165 transmits information on the calculated estimated time period to the controller 12 via the data transmitting-receiving unit 162 and the network I/F 161.

For time frames of a specific day, namely a certain day when an update is to be performed, the heavy-operation estimation unit 166 calculates, for each time frame, an amount of operation per unit time for the printer 14 in accordance with a certain operation history stored in the operation history memory 163. Specifically, the heavy-operation estimation unit 166 calculates an amount of operation per unit time by any of plural methods, and which method is to be used is stored and set in advance in a memory. In the exemplary embodiment, calculation is performed either by a method in which an average value obtained from the latest operation is calculated as an amount of operation per unit time for the printer 14 or by a method in which an average value obtained from operations performed on the same day of the week is calculated as an amount of operation per unit time for the printer 14. The heavy-operation estimation unit 166 supplies the calculated amount of operation per unit time to the update inappropriateness time frame calculation unit 169.

The degree-of-environmental-deterioration calculation unit 167 calculates, in accordance with an environment change history stored in the environment change history memory 164, a degree of environmental deterioration per unit time of a specific day, namely a certain day when an update is to be performed. That is, the degree-of-environmental-deterioration calculation unit 167 calculates a degree of environmental deterioration in the case where the internal environment of the printer 14 is not maintained by performing an update. Specifically, in the case where a certain unit used to maintain the internal environment of the printer 14 in a certain state becomes inoperable when an update is performed, it is assumed that the internal environment of the printer 14 becomes almost the same as the external environment (temperature, humidity, and the like) of the printer 14. Thus, the degree-of-environmental-deterioration calculation unit 167 acquires, from the environment change history memory 164, pieces of environment change history data obtained in an environment similar to that of the day when an update is to be performed, and calculates a degree of environmental deterioration per unit time using these pieces of environment change history data. Pieces of environment change history data obtained in an environment similar to that of the day when an update is to be performed are usually pieces of environment change history data of the latest day; however, such pieces of environment change history data are not limited to those of the latest day. The degree-of-environmental-deterioration calculation unit 167 supplies a calculated degree of environmental deterioration per unit time to the update inappropriateness time frame calculation unit 169.

The update module memory 168 stores update modules for respective targets, the update modules being used to perform updates. Update modules are control programs for units of the printer 14 and include, for example, dryer heater control firmware, ink heater control firmware, humidifier firmware, head nozzle heater control firmware, and the like of the printer 14. For example, in the case where ink heater control firmware is to be updated, the ink heater is inoperable while the update is being performed and the temperature of ink is affected by ambient temperature. Thus, in the case where the ambient temperature is low, it needs time to heat ink to a certain temperature preset in advance. In addition, the update module memory 168 stores an update history for targets updated in the past. The update history includes the date of an update, a name or ID of an update target, the size of an update module, a time period required for performing the update, and a time period required for performing a reboot after the update has been performed. The update performance time period calculation unit 165 calculates an estimated time period to be required for performing an update this time in accordance with these pieces of data included in the update history. Note that, in the exemplary embodiment, the update history is stored in the update module memory 168; however, such an update history may also be stored in the operation history memory 163 instead of in the update module memory 168. In this case, the update performance time period calculation unit 165 calculates an update performance time period in accordance with a certain update history stored in the operation history memory 163.

The update inappropriateness time frame calculation unit 169 calculates an update inappropriateness time frame during which it is inappropriate to perform an update in accordance with an amount of operation per unit time calculated by the heavy-operation estimation unit 166 and a degree of environmental deterioration per unit time calculated by the degree-of-environmental-deterioration calculation unit 167. Specifically, an amount of operation per unit time and a degree of environmental deterioration per unit time are converted into numerical values, and an update inappropriateness index is calculated using the numerical values such that the greater the amount of operation or the degree of environmental deterioration, the greater the value of the update inappropriateness index. That is, when an update inappropriateness index is denoted by UNC(t), an amount of operation by PV(t), and a degree of environmental deterioration by ENV(t), an update inappropriateness index UNC is calculated using a specific function f such that $$UNC(t)=f(PV(t),ENV(t)),$$

$$df/dPV>0, \text{ and}$$

$$df/dENV>0.$$

Here, PV(t) and ENV(t) are functions of time t since PV(t) and ENV(t) are physical quantities based on time, and as a matter of course, an update inappropriateness index UNC(t) is also a function of time t. In addition, this time t is also a function for a specific day, namely a day when an update is to be performed. Then, the update inappropriateness index is compared with a certain threshold, and a time frame during which the update inappropriateness index exceeds the certain threshold is determined as an update inappropriateness time frame. The update inappropriateness time frame calculation unit 169 transmits information on the calculated update inappropriateness time frame to the controller 12 via the data transmitting-receiving unit 162 and the network I/F 161.

The management server 16 has a hardware configuration that general computers have, that is, a central processing unit (CPU), a memory, an input-output device, and an input-output interface, and functional blocks of FIG. 2 are realized by executing processing programs stored in a program memory using the CPU. Specifically, the network I/F 161 and the data transmitting-receiving unit 162 may be realized by the input-output interface. The operation history memory 163, the environment change history memory 164, and the update module memory 168 may be realized by the memory. The update performance time period calculation unit 165, the heavy-operation estimation unit 166, and the degree-of-environmental-deterioration calculation unit 167 may be realized by one or more CPUs or application-specific integrated circuits (ASICs).

Figure 3:
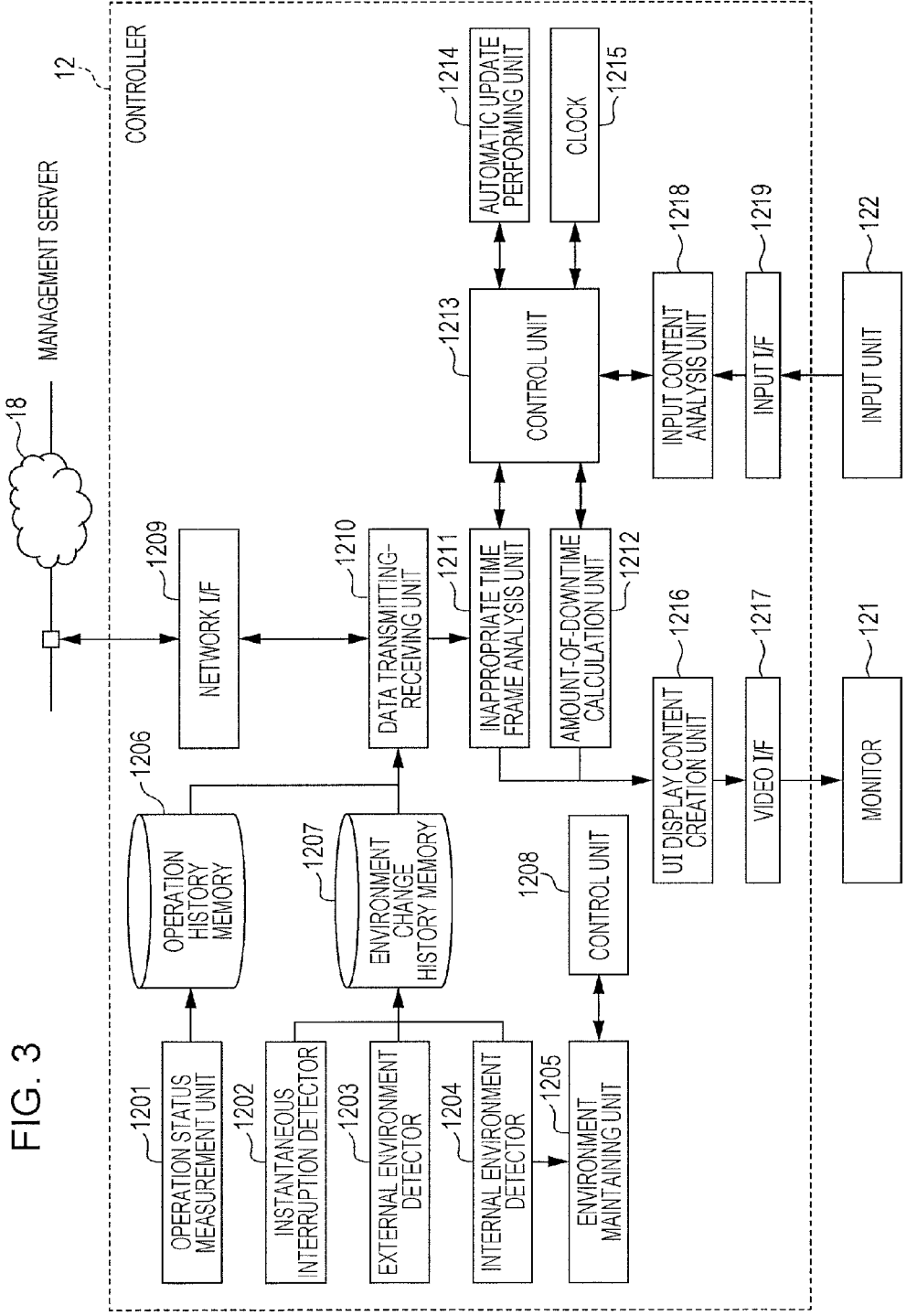
FIG. 3 is a configuration diagram of a controller.

FIG. 3 is a functional block diagram of the controller 12. The controller 12 includes an operation status measurement unit 1201, an instantaneous interruption detector 1202, an external environment detector 1203, an internal environment detector 1204, an environment maintaining unit 1205, an operation history memory 1206, an environment change history memory 1207, a control unit 1208, a network interface (I/F) 1209, a data transmitting-receiving unit 1210, an inappropriate time frame analysis unit 1211, an amount-of-downtime calculation unit 1212, a control unit 1213, an automatic update performing unit 1214, a clock 1215, a user interface (UI) display content creation unit 1216, a video interface (I/F) 1217, an input content analysis unit 1218, and an input interface (I/F) 1219. As described above, the monitor 121 and the input unit 122 are connected to the controller 12, the input unit 122 being used by a user to input setting information.

The operation status measurement unit 1201, the instantaneous interruption detector 1202, the external environment detector 1203, and the internal environment detector 1204 detect a operation status, the presence or absence of an instantaneous interruption, an external environment, and an internal environment of the printer 14, respectively. Here, an operation status is, for example, the number of printed pages of the printer 14 per a certain time (PV: Print Volume), and an instantaneous interruption is an unplanned accidental stop of power supply to the printer 14. In some emerging countries, it is known that not a few instantaneous interruptions occur. An external environment includes the temperature, humidity and the like around the printer 14, and an internal environment includes the temperature, humidity, and the like inside the printer 14. In the case where the environment around the printer 14 is almost the same as the internal environment of the printer 14 or in the case where these environments have a certain relationship therebetween in which when one of these environments is detected, the other one is automatically detected, a configuration may also be used with which either the external environment or the internal environment is detected.

The environment maintaining unit 1205 maintains at least one of the internal environment and the external environment of the printer 14 in a desired state. The environment maintaining unit 1205 maintains, for example, constant temperatures and humidities inside and outside the printer 14. An operation of the environment maintaining unit 1205 is controlled by the control unit 1208. Thus, in the case where an update is performed, when the control unit 1208 becomes incapable of controlling the environment maintaining unit 1205, the environments inside and outside the printer 14 may deteriorate.

The operation history memory 1206 stores pieces of data on an operation status of the printer 14 detected by the operation status measurement unit 1201 successively. As described above, an operation status may include an update history.

The environment change history memory 1207 stores pieces of data on the presence or absence of an instantaneous interruption detected by the instantaneous interruption detector 1202 and temperatures, humidities, and the like inside and outside the printer 14 detected by the external environment detector 1203 and the internal environment detector 1204 successively.

The data transmitting-receiving unit 1210 transmits various types of data to the management server 16 via the network I/F 1209. Transmission data include an operation history stored in the operation history memory 1206 and an environment change history. Received data include an update module and information on an estimated time period for performing an update, the estimated time period having been calculated by the management server 16, and an update inappropriateness time frame.

The inappropriate time frame analysis unit 1211 checks a time period during which an update is to be performed against an update inappropriateness time frame received from the management server 16, in accordance with a certain command from the control unit 1213, and determines whether or not the time period during which the update is to be performed corresponds to the update inappropriateness time frame.

In the case where a user allows an update to be performed in an update inappropriateness time frame, the amount-of-downtime calculation unit 1212 calculates a downtime caused by performing the update, namely the loss caused when the update is performed in the update inappropriateness time frame, in accordance with a certain command from the control unit 1213. Here, a "downtime" in the exemplary embodiment refers to the amount of the difference in the time domain between a time period for performing an update in an update inappropriateness time frame and a time period for performing the update in an update appropriateness time frame. More specifically, a downtime refers to an extra time period necessary when an update is performed in an update inappropriateness time frame, when compared with a time period for performing the update in an update appropriateness time frame.

The automatic update performing unit 1214 performs an update for the printer 14 using an update module received from the management server 16.

The input content analysis unit 1218 analyses user setting information input through the input unit 122 via the input I/F 1219 and supplies the analyzed user setting information to the control unit 1213. The user setting information includes a command for performing an update.

The UI display content creation unit 1216 converts information on an update inappropriateness time frame output from the inappropriate time frame analysis unit 1211 and an amount of downtime calculated by the amount-of-downtime calculation unit 1212 into data in a certain display format with which a user is notified, and outputs the resulting data to the monitor 121 via the video I/F 1217.

The clock 1215 supplies a current time to the control unit 1213.

The control unit 1213 controls an operation of the inappropriate time frame analysis unit 1211, that of the amount-of-downtime calculation unit 1212, and that of the automatic update performing unit 1214. Specifically, it is determined by sending a command to the inappropriate time frame analysis unit 1211 whether or not the time period during which an update specified by a user is to be performed corresponds to an update inappropriateness time frame calculated by the management server 16. In the case where the time period does not correspond to the update inappropriateness time frame, the update is performed for the printer 14 by sending a command to the automatic update performing unit 1214 using an update module received from the management server 16. In addition, in the case where the time period corresponds to the update inappropriateness time frame, the update is not basically performed; however, in the case where the user allows the update to be performed in the update inappropriateness time frame, a downtime in the case where the update is performed in the update inappropriateness time frame is calculated by sending a command to the amount-of-downtime calculation unit 1212, in accordance with an estimated time period for performing the update, and outputs the downtime to the monitor 121.

The controller 12 has a hardware configuration that general computers have, that is, a central processing unit (CPU), a memory, an input-output device, and an input-output interface, and functional blocks of FIG. 3 are realized by executing processing programs stored in a program memory using the CPU. Specifically, the network I/F 1209, the data transmitting-receiving unit 1210, the video I/F 1217, and the input I/F 1219 may be realized by the input-output interface. The operation history memory 1206 and the environment change history memory 1207 may be realized by the memory. The control units 1208 and 1213, the inappropriate time frame analysis unit 1211, the amount-of-downtime calculation unit 1212, the automatic update performing unit 1214, the UI display content creation unit 1216, and the input content analysis unit 1218 may be realized by one or more CPUs or ASICs.

In the following, processes performed by the management server 16 and the controller 12 will be described in details using flowcharts.

First, a process performed by the management server 16 will be described.

Figure 4:
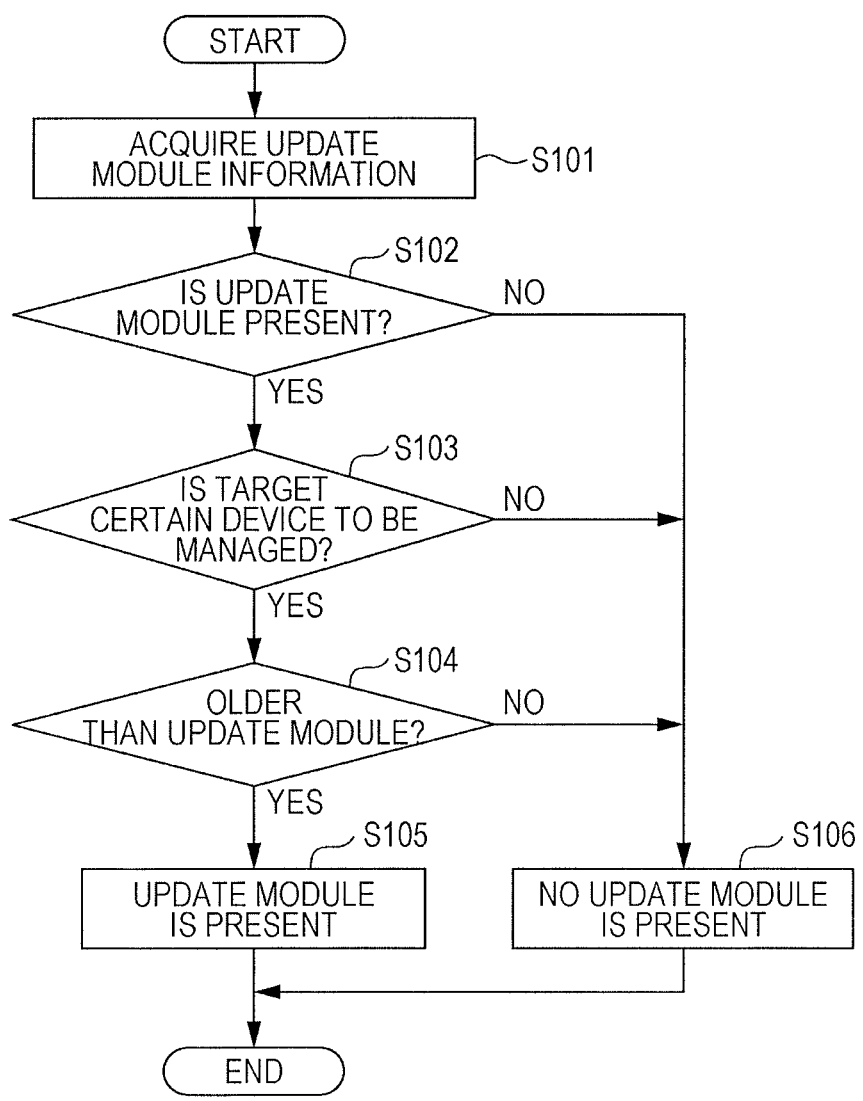
FIG. 4 is a first part of a process flowchart of the exemplary embodiment.

FIG. 4 is a process flowchart for the management server 16, and is a process flowchart in which it is determined whether or not an update module is present for the printer 14, which is a management target.

The management server 16 acquires update module information at regular or irregular intervals and stores the information in the update module memory 168 (S101). An update module includes a control program (control firmware) for a management target device (including the printer 14).

The update performance time period calculation unit 165 of the management server 16 accesses the update module memory 168 at a certain control timing and determines whether or not an update module is present (S102).

In the case where an update module is present (YES in S102), the update performance time period calculation unit 165 then determines whether or not a target of the update module, which is present, is the printer 14 (S103).

In the case where the target of the update module is the printer 14 (YES in S103), the update performance time period calculation unit 165 further determines whether or not the version of a current control program (control firmware) of the printer 14 is older than that of the update module (S104).

In the case where the version of the current control program of the printer 14 is older than that of the update module (YES in S104), the update performance time period calculation unit 165 sets a setting indicating that a certain update module is present (S105). In contrast, in any of the cases where no update module is present (NO in S102), where the target of the target module is not the printer 14 (NO in S103), and where the version of the current control program of the printer 14 is not older than that of the update module (NO in S104), a setting is set indicating that no update module is present (S106).

Figure 5:
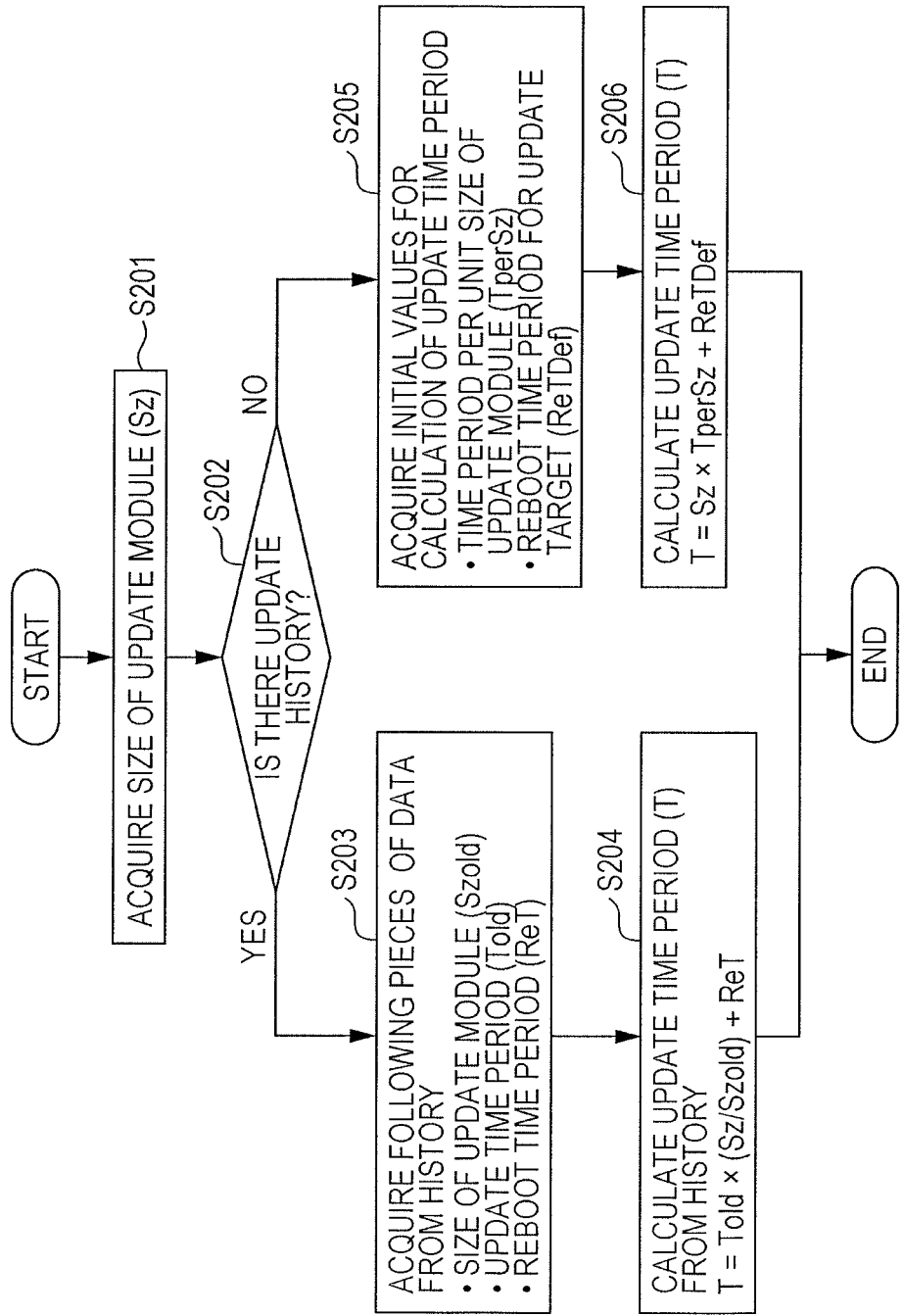
FIG. 5 is a second part of the process flowchart of the exemplary embodiment.

FIG. 5 is a process flowchart for the management server 16, and is a process flowchart in the case where a setting is set indicating that a certain update module is present.

The update performance time period calculation unit 165 of the management server 16 acquires the size of an update module (Sz) for the printer 14 stored in the update module memory 168 (S201).

Next, it is determined whether or not there is an update history for the printer 14 (S202). In the case where a history is stored in the update module memory 168, it is determined whether or not there is an update history for the printer 14 by accessing the update module memory 168. In the case where a history is stored in the operation history memory 163, it is determined whether or not there is an update history for the printer 14 by accessing the operation history memory 163.

In the case where there is an update history for the printer 14 (YES in S202), the update performance time period calculation unit 165 acquires, from the update history for the printer 14, the size of an update module (Szold), an update time period (Told), and a reboot time period (ReT) obtained at that time (S203). A reboot time period is a time period required before it becomes possible to reboot the printer 14 after installation of an update module (a warm-up time). In general, in the case where a portion of a device is rebooted, the reboot time period is short, and in the case where the entirety of a device is rebooted, the reboot time period becomes longer. Then, an estimated time period to be required for performing an update this time is calculated from these acquired pieces of history data (S204).

For example, an estimated time period T is calculated from

Estimated Time Period $T=Told\times(Sz/Szold)+ReT$.

This expression is based on a fact that a time period required for performing an update increases in proportion to the size of an update module.

In contrast, in the case where there is no update history for the printer 14 because of the circumstances under which, for example, an update to be performed this time is the first update (NO in S202), the update performance time period calculation unit 165 acquires a time period per unit size of an update module (TperSz) and a reboot time period for an update target (ReTDef) as initial values for calculation of an update time period (S205). These pieces of time data have only to be stored in a memory of the update performance time period calculation unit 165 in advance, or may also be stored in the update module memory 168. Then, an estimated time period, which is considered to be a time period to be required for performing an update this time, is calculated from these acquired pieces of data (S206).

For example, an estimated time period T is calculated from

Estimated Time Period $T=Sz\times TperSz+ReTDef$.

The update performance time period calculation unit 165 transmits information on the calculated estimated time period T to the controller 12 via the data transmitting-receiving unit 162 and the network I/F 161. Note that, as described later, the estimated time period T is used when an amount of downtime is calculated by the controller 12.

Figure 6:
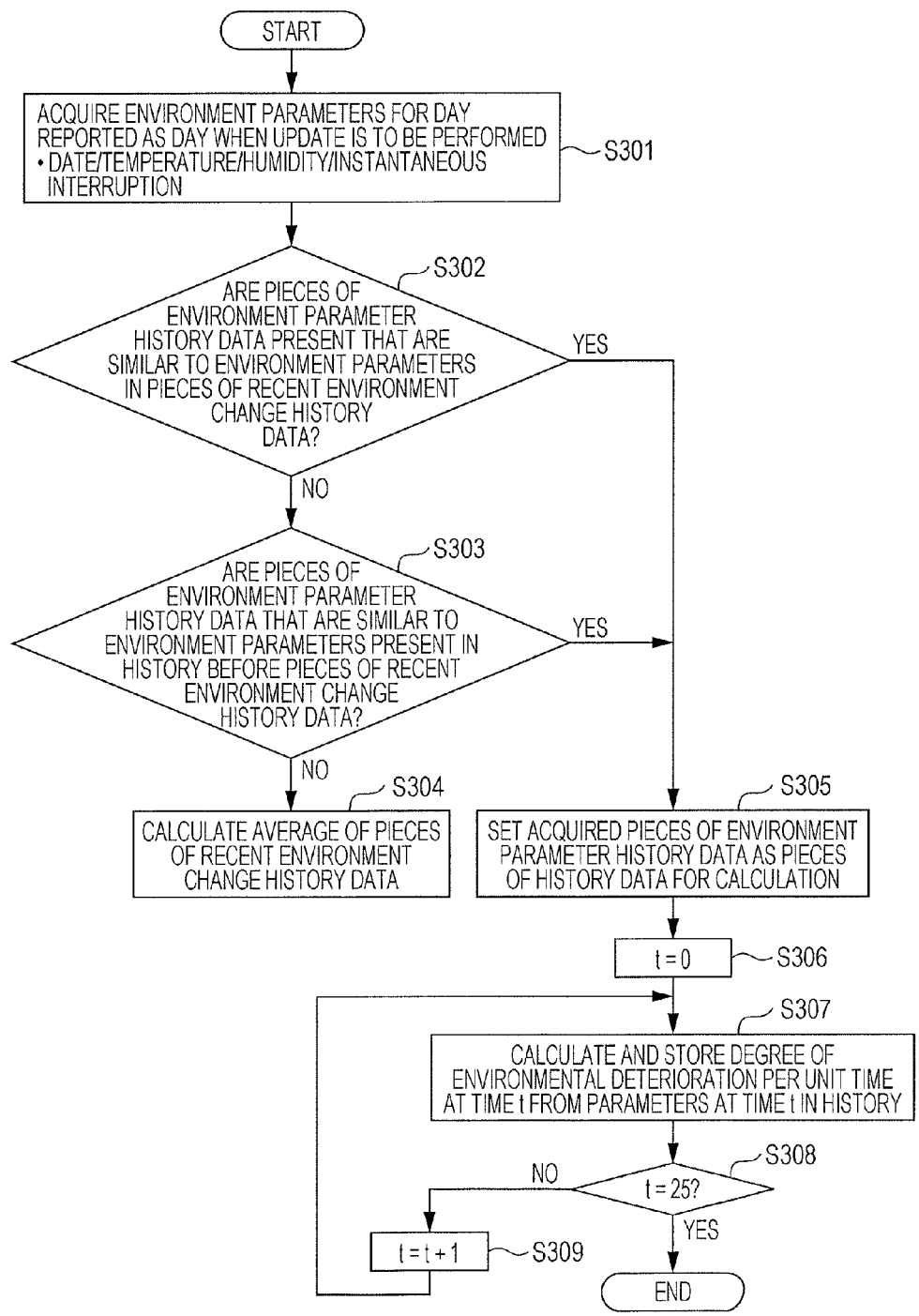
FIG. 6 is a third part of the process flowchart of the exemplary embodiment.

FIG. 6 is a process flowchart for the management server 16, and illustrates a process in which a degree of environmental deterioration is calculated, the degree of environmental deterioration being caused when an update is to be performed on a specific day.

The degree-of-environmental-deterioration calculation unit 167 of the management server 16 acquires environment parameters for a day specified and reported as a day when an update is to be performed (S301). The environment parameters include a date, a temperature, a humidity, the presence or absence of an instantaneous interruption, and the like.

Next, the degree-of-environmental-deterioration calculation unit 167 accesses the environment change history memory 164, and determines whether or not pieces of environment parameter history data are present that are similar to the environment parameters in pieces of recent environment change history data (S302). In the case where no such pieces of environment parameter history data are present (NO in S302), it is determined whether or not pieces of environment parameter history data are present that are similar to the environment parameters in pieces of environment change history data stored before the pieces of the recent environment change history data (S303). In the case where pieces of environment parameter history data are not present that are similar to the environment parameters in the pieces of recent environment change history data and the pieces of environment change history data stored before the pieces of recent environment change history data (NO in S303), the average of the pieces of recent environment change history data is calculated (S304).

In contrast, in the case where pieces of environment parameter history data are present that are similar to the environment parameters in the pieces of recent environment change history data (YES in S302) or in the case where pieces of environment parameter history data are present that are similar to the environment parameters in the pieces of environment change history data stored before the pieces of recent environment change history data (YES in S303), the pieces of environment parameter history data are acquired and set as pieces of history data for calculation (S305). For example, in the case where the day specified and reported as the day when the update is to be performed is Aug. 22, 2014 and where the temperature is 30° C., and the humidity is 50% on that day at 9:00 a.m., pieces of environment change history data of Aug. 21, 2014 are acquired and set as pieces of history data for calculation, the temperature and humidity of Aug. 21, 2014 being similar to those of Aug. 22, 2014. Note that, in the case where the average has been calculated in S304, this average is set as a piece of history data for calculation.

Next, a time parameter t is set to 12:00 midnight (S306), and a degree of environmental deterioration per unit time at time t is calculated from parameters at time t in a certain history and stored in a memory (S307). This processing is repeatedly executed from 12:00 midnight to 12:00 midnight the next day and a degree of environmental deterioration is calculated for every hour (S308 and S309).

As a result, for example,
12:00 midnight: Temperature 15° C., Humidity 30%
1:00 a.m.: Temperature 15° C., Humidity 30%
...
9:00 a.m.: Temperature 30° C., Humidity 50%
10:00 a.m.: Temperature 31° C., Humidity 51%
...
11:00 p.m.: Temperature 20° C., Humidity 25%
12:00 midnight the next day: Temperature 19° C., Humidity 25%
and so on are obtained. Here, "12:00 midnight" refers to a time frame from 12:00 midnight to 12:59 a.m. and "1:00 a.m." refers to a time frame from 1:00 a.m. to 1:59 a.m. The same goes for other time frames. In the case where pieces of environment parameter history data are not present that are similar to the environment parameters, the average of pieces of recent environment change history data are obtained as the environment parameters. The number of pieces of history data used for calculation of an average may be any number. For example, pieces of history data for the last ten days may be used.

Figure 7:
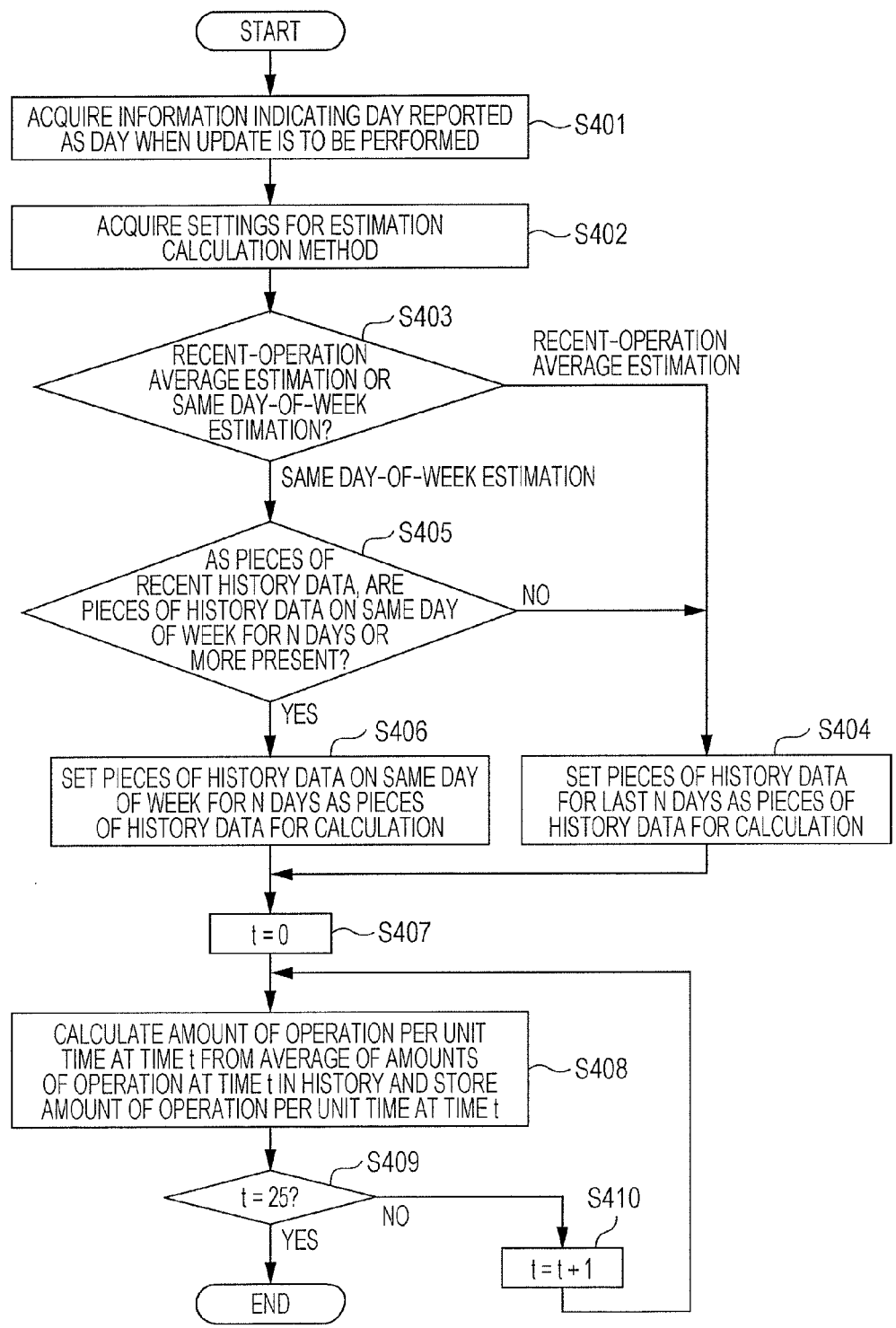
FIG. 7 is a fourth part of the process flowchart of the exemplary embodiment.

FIG. 7 is a process flowchart for the management server 16, and illustrates a process in which an estimated amount of operation of the printer 14 is calculated for a specific day.

The heavy-operation estimation unit 166 of the management server 16 acquires information indicating a day specified and reported as a day when an update is to be performed (S401). Then, settings for an estimation calculation method are acquired (S402). Estimation calculation methods include, in the case where calculation is performed in accordance with an operation history, a method in which the average of pieces of recent history data is used and a method in which pieces of history data on the same day of the week are used (S403). In the case of a recent-operation average estimation, in which the average of pieces of recent history data is used for estimation, pieces of history data for the last N days are read from the operation history memory 163 and set as pieces of history data for calculation (S404). In the case of a same day-of-week estimation, in which pieces of history data on the same day of the week are used for estimation, it is determined whether or not pieces of history data on the same day of the week for N days or more are present as pieces of recent history data on the same day of the week, N being a preset number. In the case where pieces of history data on the same day of the week for N days or more are present and are considered to be sufficiently reliable (YES in S405), the pieces of history data on the same day of the week for N days are read from the operation history memory 163 and set as pieces of history data for calculation (S406). An estimation calculation method is stored as a setting value in a certain memory in advance. In addition, information indicating N days is likewise stored as a setting value in a certain memory in advance.

Next, the time parameter t is set to 12:00 midnight (S407), and an amount of operation per unit time at time t is calculated from the average of amounts of operation at time t in a certain history and is stored in a certain memory (S408). This processing is repeatedly executed from 12:00 midnight to 12:00 midnight the next day and an amount of operation per unit time is calculated for every hour (S409 and S410).

As a result, for example, an amount of operation is denoted by PV, and
12:00 midnight: 0
1:00 a.m.: 0
...
9:00 a.m.: 100
10:00 a.m.: 120
...
11:00 p.m.: 0
12:00 midnight the next day: 0
and so on are obtained. Here, "12:00 midnight" refers to from 12:00 midnight to 12:59 a.m., and "1:00 a.m." from 1:00 a.m. to 1:59 a.m. This is almost the same as those in the case of the degree of environmental deterioration.

Figure 8:
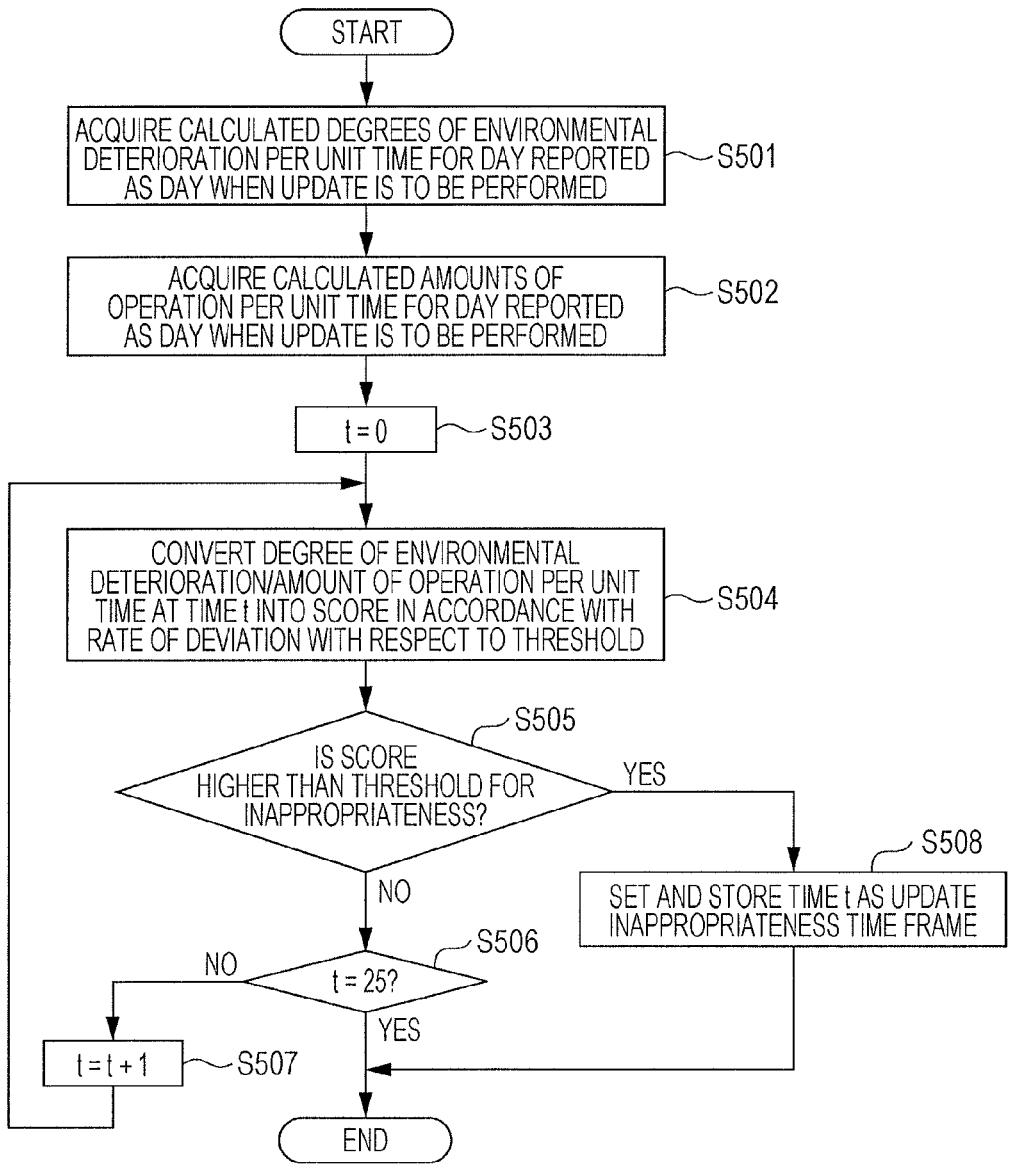
FIG. 8 is a fifth part of the process flowchart of the exemplary embodiment.

FIG. 8 is a process flowchart for the management server 16, and illustrates a process in which an update inappropriateness time frame is calculated.

The update inappropriateness time frame calculation unit 169 of the management server 16 acquires degrees of environmental deterioration per unit time calculated by the degree-of-environmental-deterioration calculation unit 167 (S501), and acquires amounts of operation per unit time calculated by the heavy-operation estimation unit 166 (S502).

Next, the time parameter t is set to 12:00 midnight (S503), and the degree of inappropriateness for performing an update is converted into an index (a score) using a degree of environmental deterioration and an amount of operation per unit time at time t (S504). Specifically, PV serving as an amount of operation and the temperature and humidity serving as a degree of environmental deterioration are converted into numerical values by considering that the lower the temperature and humidity are, the greater the degree of environmental deterioration is. An update inappropriateness index is calculated such that the greater the amount of operation or the greater the degree of environmental deterioration, the greater the update inappropriateness index.

For example, an update inappropriateness index is calculated from

Update Inappropriateness Index=PV Index+Temperature Index+Humidity Index.

As a matter of course, it is easily understood that this expression is a mere example of a function f that satisfies $UNC(t)=f(PV(t),ENV(t))$ described above. Then, it is determined whether or not the calculated score is higher than a certain threshold for inappropriateness (S505). In the case where the calculated score is higher than the threshold for inappropriateness (YES in S505), a time t at that time is set as an update inappropriateness time frame and stored in a certain memory (S508). This processing is repeatedly executed from 12:00 midnight to 12:00 midnight the next day and an update inappropriateness time frame is calculated (S506 and S507). The update inappropriateness time frame calculation unit 169 transmits information on the calculated update inappropriateness time frame to the controller 12 via the data transmitting-receiving unit 162 and the network I/F 161.

Information transmitted from the management server 16 to the controller 12 is summarized as follows.
    the update module for the printer 14
    the estimated time period for performing an update
    the update inappropriateness time frame Next, a process performed by the controller 12 will be described.

Figure 9:
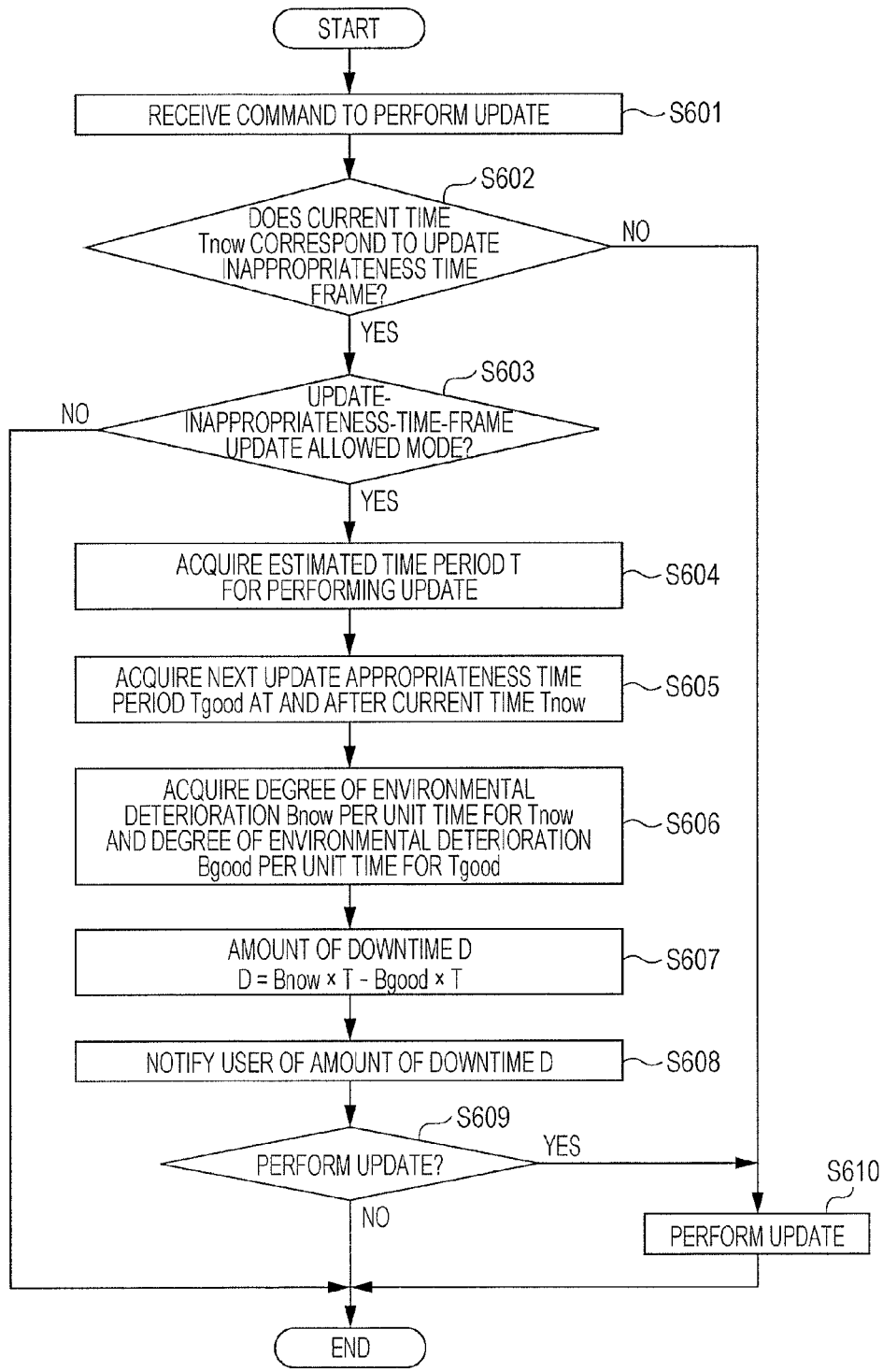
FIG. 9 is a sixth part of the process flowchart of the exemplary embodiment.

FIG. 9 is a process flowchart for the controller 12, and illustrates a process for performing an update for the printer 14 in accordance with the update inappropriateness time frame calculated by the management server 16.

First, when the control unit 1213 receives a command to perform an update from the client 10 or the input unit 122 (S601), the control unit 1213 acquires a current time Tnow from the clock 1215 and commands the inappropriate time frame analysis unit 1211 to determine whether or not the current time Tnow corresponds to the update inappropriateness time frame calculated by the management server 16 (S602). Specifically, information on the update inappropriateness time frame received from the management server 16 is stored in a certain memory of the inappropriate time frame analysis unit 1211, and the inappropriate time frame analysis unit 1211 checks the current time Tnow against the update inappropriateness time frame, information of which is stored in the memory, and determines whether or not they match. For example, when the current time Tnow is 9:00 a.m. and the update inappropriateness time frame is from 9:00 a.m. to 12:00 noon, it is determined that the current time Tnow corresponds to the update inappropriateness time frame. In the case where the current time Tnow does not correspond to the update inappropriateness time frame (NO in S602), the control unit 1213 commands the automatic update performing unit 1214 to perform an update for the printer 14 (S610). That is, an update module received from the management server 16 is installed in the printer 14.

In contrast, in the case where the current time Tnow corresponds to the update inappropriateness time frame (YES in S602), the control unit 1213 then determines whether or not a mode is an update-inappropriateness-time-frame update allowed mode (S603). The update-inappropriateness-time-frame update allowed mode is a mode preset by a user and is a mode in which an update is allowed to be performed even in an update inappropriateness time frame. The update-inappropriateness-time-frame update allowed mode may be preset by a user and stored in a certain memory of the control unit 1213, or may also be input as the need arises in accordance with display on the monitor 121. In the case where the mode is not the update-inappropriateness-time-frame update allowed mode (NO in S603), the update is not performed. In the case where the mode is set to the update-inappropriateness-time-frame update allowed mode even in the update inappropriateness time frame since the update needs to be performed for some reason (YES in S603), the control unit 1213 acquires an estimated time period T for performing the update, the estimated time period T having been received from the management server 16 (S604). In addition, the control unit 1213 acquires the next update appropriateness time period Tgood at and after the current time Tnow (S605). Here, an update appropriateness time period Tgood refers to a time frame that is not set as an update inappropriateness time frame.

For example, in the case where the current time Tnow is 9:00 a.m. and an update inappropriateness time frame is from 9:00 a.m. to 12:00 noon, the most recent update appropriateness time period Tgood is 1:00 p.m. Furthermore, the control unit 1213 sends a command to the amount-of-downtime calculation unit 1212. The amount-of-downtime calculation unit 1212 acquires a degree of environmental deterioration Bnow per unit time for Tnow and a degree of environmental deterioration Bgood per unit time for Tgood (S606), and calculates an amount of downtime D in accordance with these degrees of environmental deterioration (S607).

For example, the amount of downtime D is calculated from $$D = Bnow \times T - Bgood \times T.$$

Here, Bnow and Bgood are calculated as the sum of a temperature index and a humidity index to be used when an update inappropriateness index is calculated. Tnow corresponds to an update inappropriateness time frame and Tgood corresponds to an update appropriateness time frame. Thus, usually, (Bnow×T)>(Bgood×T), and the difference between (Bnow×T) and (Bgood×T) is an index indicating how much more time is needed in the case where an update is performed at the current time Tnow than in the case where the update is performed in a more appropriate time frame. It should be noted that the amount of downtime D is calculated using the estimated time period T and the degrees of environmental deterioration calculated by the management server 16. The amount-of-downtime calculation unit 1212 notifies the user of the calculated amount of downtime D by displaying the calculated amount of downtime D on the monitor 121 (S608).

For example, "The current time is in an update inappropriateness time frame and an extra time corresponding to the amount of downtime D is needed when compared with the case where the update is performed in an update appropriateness time frame. Do you want to perform an update?" or the like is displayed. The user sees the amount of downtime D displayed on the monitor 121 and determines whether or not to perform the update (S609). In the case where it is determined that the update is to be performed, the user sends a command to perform the update through the input unit 122. In response to this command, the control unit 1213 sends a command to the automatic update performing unit 1214 and the update for the printer 14 is performed (S610). When the amount of downtime D is outside an allowable range, the user does not allow the update to be performed (NO in S609) and the control unit 1213 does not perform the update.

As described above, the controller 12 receives, from the management server 16, the update module for the printer 14 and pieces of information on the estimated time period T for performing the update and the update inappropriateness time frame. In the case where a time specified by the user for performing the update does not correspond to an update inappropriateness time frame, the update is performed for the printer 14 using the update module. In the case where the time specified by the user for performing the update corresponds to an update inappropriateness time frame, an amount of downtime D is calculated using an estimated time period T for performing the update and the user is notified of the amount of downtime D.

Next, the process according to the exemplary embodiment will be described in greater detail.

FIG. 10 is an example of an update history stored in the update module memory 168 or the operation history memory 163 of the management server 16. An update history includes a start date and time, an update target, the size of an update module, an update time period, and a reboot time period. For example, an update is performed for dryer heater control firmware at 6:15:22 p.m. on Oct. 12, 2013. For this case, the size of an update module is 125 MB, the update time period is 10 minutes, and the reboot time period is 5 minutes. In addition, an update is performed for ink heater control firmware at 8:05:21 p.m. on Dec. 20, 2013. For this case, the size of an update module is 205 MB, the update time period is 25 minutes, and the reboot time period is 20 minutes.

FIG. 11 is an example of an estimated time period for performing an update calculated by the update performance time period calculation unit 165 of the management server 16. As already described above, in the case where there is an update history, calculation is performed in accordance with the update history. In the case where there is no update history, calculation is performed in accordance with preset initial values. In the case where the ink heater control firmware is an update target, there is an update history as illustrated in FIG. 10 and thus calculation is performed in accordance with this update history. Specifically, as illustrated in S204 of the process flowchart of FIG. 5, Estimated Time Period $T$ for Performing an Update=$Told \times (Sz/Szold) + ReT$.

From the update history of FIG. 10,
Told=25 minutes,
Szold=205 MB, and
ReT=20 minutes
are obtained. Thus, $T$=25 minutes×($Sz$/205 MB)+20 minutes.

Note that, in FIG. 11, as an example, the size of an update module is 350 MB and the update time period is 37 minutes for the ink heater control firmware.

In contrast, in the case where the head nozzle heater control firmware is an update target, there is no update history data illustrated in FIG. 10 and thus calculation is performed in accordance with preset initial values. When a certain initial value is set to 1 minute per 10 MB, if the size of an update module is 500 MB, as illustrated in S206 of the process flowchart of FIG. 5, Estimated Time Period $T$ for Performing an Update=$Sz \times TperSz + ReTDef$.

Thus, $$T = 500 \times 1 \text{ minutes}/10 \text{ MB} + ReTDef$$

$$= 50 \text{ minutes} + ReTDef.$$

In FIG. 11, an initial value for the reboot time period is set such that ReTDef=20 minutes (an entire reboot).

Figure 12A:
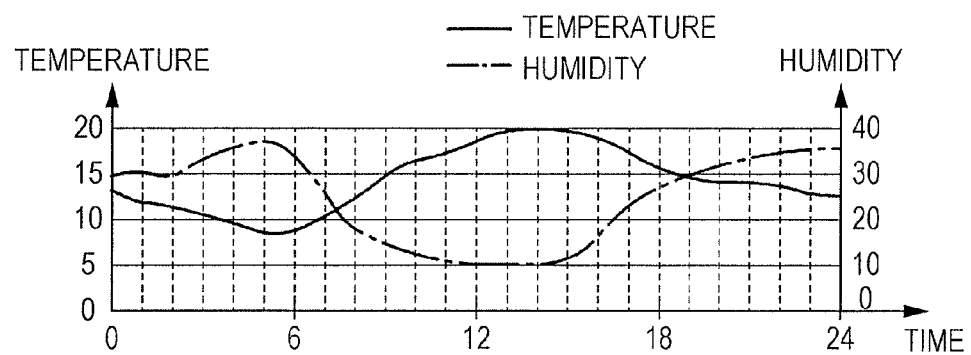
FIGS. 12A to 12C are graphs illustrating an example of an environment change history, an example of a degree-of-environmental-deterioration history, and an example of an operation history.
Figure 12B:
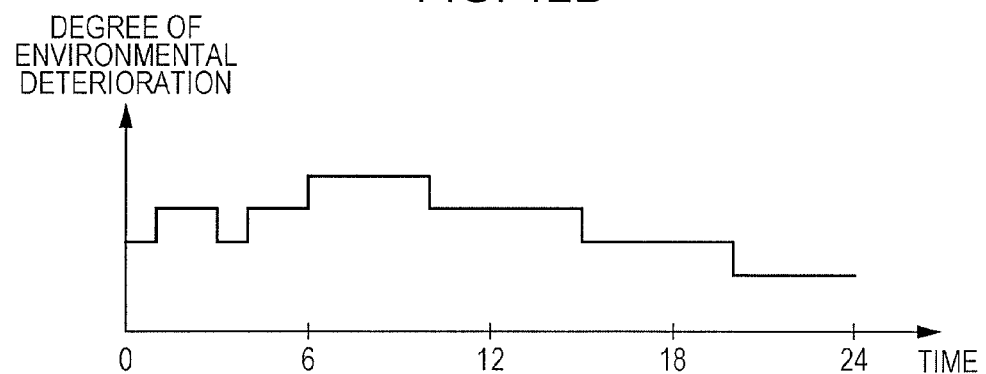
Figure 12C:
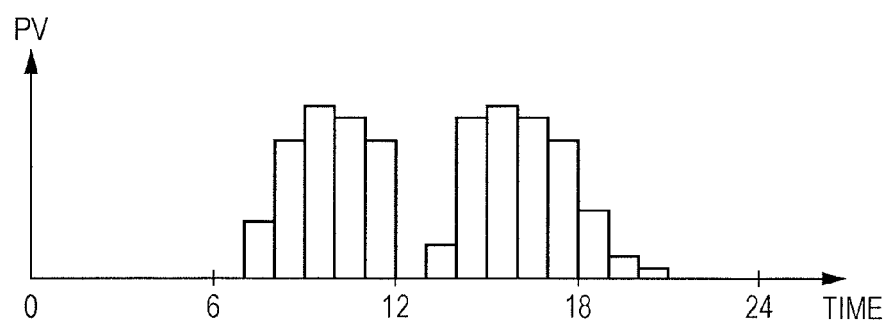

FIGS. 12A to 12C are an example of an environment change history, an example of a degree-of-environmental-deterioration history, and an example of an operation history, respectively. FIG. 12A is a temperature-and-humidity change history. The horizontal axis represents time, the left vertical axis represents temperature, and the right vertical axis represents humidity.

FIG. 12B illustrates a degree-of-environmental-deterioration history. The horizontal axis represents time and the vertical axis represents the degree of deterioration, which is converted into a numerical value in accordance with a certain standard. In the case where the printer 14 is an ink-jet printer, high temperatures and high humidities are preferable for ink-jet printers. In contrast, low temperatures and low humidities are not preferable, and it may be said that an environment has "deteriorated". Thus, for example, when a degree of environmental deterioration is defined as Degree of Environmental Deterioration=(C1/Temperature)+(C2/Humidity), where C1 and C2 are constants, the lower the temperature and humidity are, the greater value the degree of environmental deterioration has, and the higher the temperature and humidity are, the smaller value the degree of environmental deterioration has. In FIG. 12B, since both the temperature and the humidity are relatively low from 6:00 a.m. to 10:00 a.m., the degree of environmental deterioration increases.

FIG. 12C illustrates an operation history. The horizontal axis represents time and the vertical axis represents print volume (PV). FIG. 12C illustrates a state in which no operation is performed at night time from 9:00 p.m. to 7:00 a.m. and an operation is performed during the daytime.

FIG. 13 is an example of an update inappropriateness index in every unit time of a certain specific day. As illustrated in S504 of the flowchart of FIG. 8, in the management server 16, a degree of inappropriateness is converted into a score (an index) in accordance with a degree of environmental deterioration and an amount of operation. In FIG. 13, both PV serving as an amount of operation and a temperature and a humidity serving as a degree of environmental deterioration are converted into numerical values and illustrated. Note that, as described above, since the lower the temperature and humidity are, the greater the degree of environmental deterioration becomes, the temperature and humidity are converted into numerical values by taking this point into consideration. An update inappropriateness index is calculated such that the greater the amount of operation or the greater the degree of environmental deterioration, the greater the update inappropriateness index.

The update inappropriateness index is defined as Update Inappropriateness Index=PV Index+Temperature Index+Humidity Index.

In accordance with this expression, since PV=0, Temperature=3, and Humidity=1 at 12:00 midnight, Update Inappropriateness Index=4 is obtained. Likewise, since PV=5, Temperature=2, and Humidity=4 at 9:00 a.m., Update Inappropriateness Index=11 is obtained. The update inappropriateness index is compared with a certain threshold as illustrated in S505 and S508 of the flowchart of FIG. 8. In the case where the update inappropriateness index is greater than the certain threshold, a time frame having the update inappropriateness index is set as an update inappropriateness time frame. In FIG. 13, when the certain threshold is, for example, "5", a time frame having an update inappropriateness of 6 or greater is set as an update inappropriateness time frame. In FIG. 13, a time frame from 6:00 a.m. to 11:00 a.m. and a time frame from 1:00 p.m. to 6:00 p.m. are set as update inappropriateness time frames.

Figure 14:
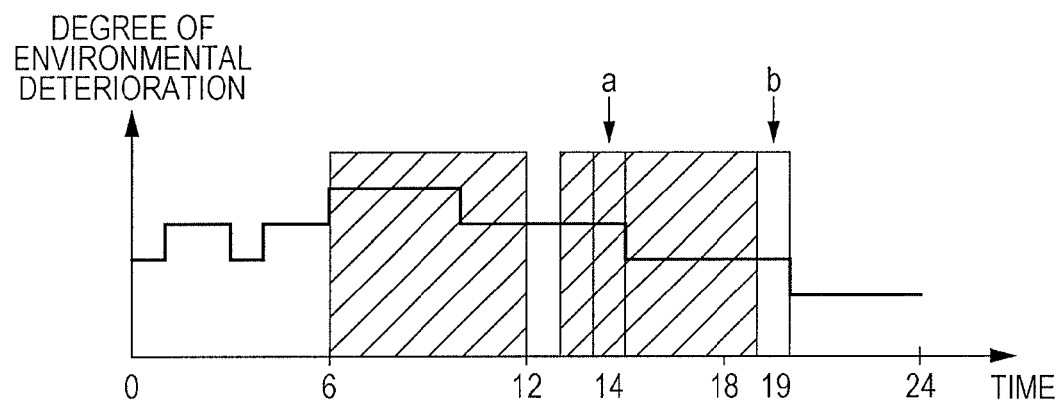
FIG. 14 is a diagram used to explain calculation of an amount of downtime.

FIG. 14 illustrates both the degree of environmental deterioration and update inappropriateness time frames. The horizontal axis represents time, the vertical axis represents the degree of environmental deterioration, and hatched time frames represent update inappropriateness time frames. In the case where the printer 14 enters its idle state in a printing operation at 2:00 p.m. (a time frame denoted by "a" in FIG. 14), the user sends a command to perform an update for the printer 14. However, since this time frame is an update inappropriateness time frame, no update is basically performed (YES in S602 of the flowchart of FIG. 9). Here, in the case where the user has input through the input unit 122 data indicating that an update is allowed to be performed even in an update inappropriateness time frame (YES in S603 of the flowchart of FIG. 9), the controller 12 calculates an amount of downtime D (S604 to S608 of the flowchart of FIG. 9). That is, an update appropriateness time period Tgood is acquired, which is a time period right after the time frame "a" for which the user has allowed an update to be performed. In FIG. 14, since an update inappropriateness time frame is from 1:00 p.m. to 6:00 p.m., an update appropriateness time frame right after the update inappropriateness time frame is 7:00 p.m. (a time frame denoted by "b" in FIG. 14). The controller 12 calculates a degree of environmental deterioration for the time frame denoted by "a", a degree of environmental deterioration for the time frame denoted by "b", and the difference between these degrees of environmental deterioration, and outputs the difference as an amount of downtime D to the monitor 121.

For example, since an environment deterioration index at 2:00 p.m. is 5 and an environment deterioration index at 7:00 p.m. is 4, when an estimated time period for performing an update is denoted by T, $$\text{Amount of Downtime } D = (5-4) \times T$$

is output to the monitor 121. By seeing the amount of downtime D on the monitor 121, the user may determine quantitatively the loss caused when an update is performed in the update inappropriateness time frame (the time frame denoted by "a" in FIG. 14) and may acquire information to make a determination as to whether or not the update should be performed in the time frame.

Figure 15A:
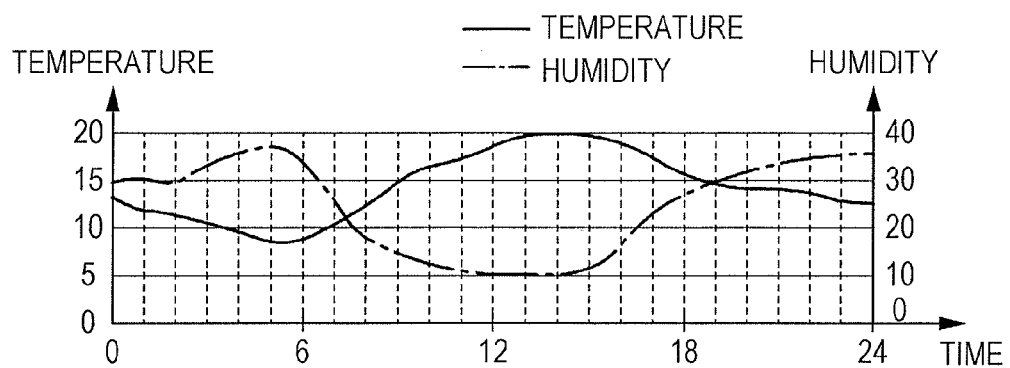
FIGS. 15A to 15C are graphs illustrating another example of an environment change history, another example of a degree-of-environmental-deterioration history, and another example of an operation history.
Figure 15B:
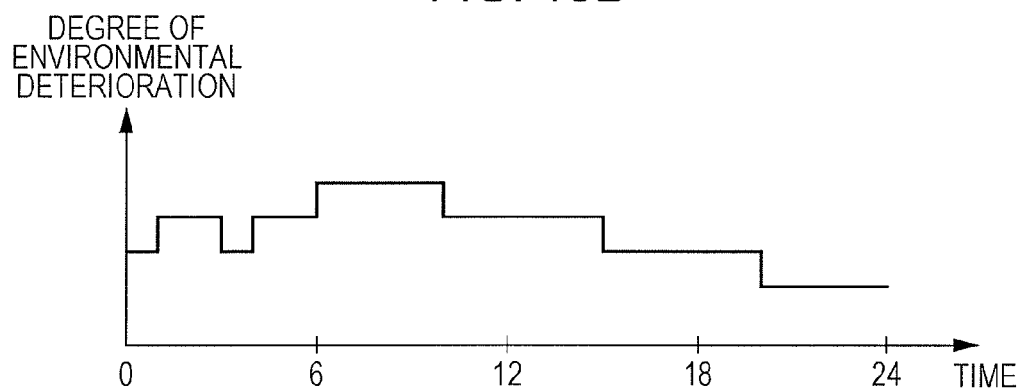
Figure 15C:
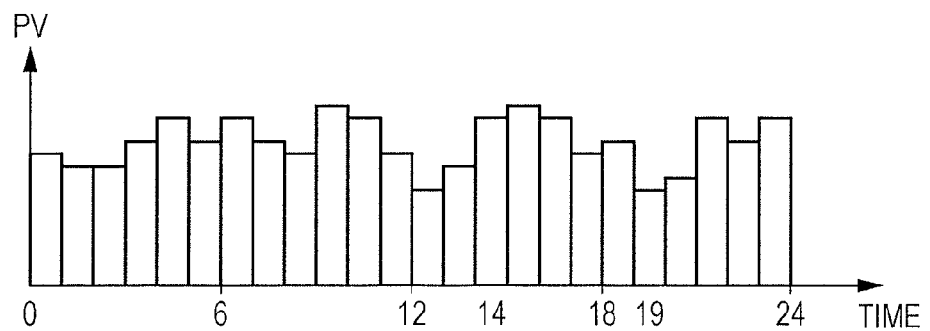

FIGS. 15A to 15C are another example of an environment change history, another example of a degree-of-environmental-deterioration history, and another example of an operation history, respectively. FIG. 15A is a temperature-and-humidity change history. The horizontal axis represents time, the left vertical axis represents temperature, and the right vertical axis represents humidity.

FIG. 15B illustrates a degree-of-environmental-deterioration history. The horizontal axis represents time and the vertical axis represents the degree of deterioration, which is converted into a numerical value in accordance with a certain standard.

FIG. 15C illustrates an operation history. The horizontal axis represents time and the vertical axis represents print volume (PV). FIG. 15C illustrates the case where an operation status does not change greatly and is in an all-night operation state.

FIG. 16 is an example of an update inappropriateness index in every unit time of a certain specific day. In FIG. 16, both PV serving as an amount of operation and a temperature and a humidity serving as a degree of environmental deterioration are converted into numerical values and illustrated. An update inappropriateness index is likewise defined as $$\text{Update Inappropriateness Index} = \text{PV Index} + \text{Temperature Index} + \text{Humidity Index}.$$

In FIG. 16, when a certain threshold is, for example, "5", a time frame having an update inappropriateness index of 6 or greater is set as an update inappropriateness time frame, and a time frame from 1:00 a.m. to 6:00 p.m., a time frame of 9:00 p.m., and a time frame of 11:00 p.m. are set as update inappropriateness time frames.

Figure 17:
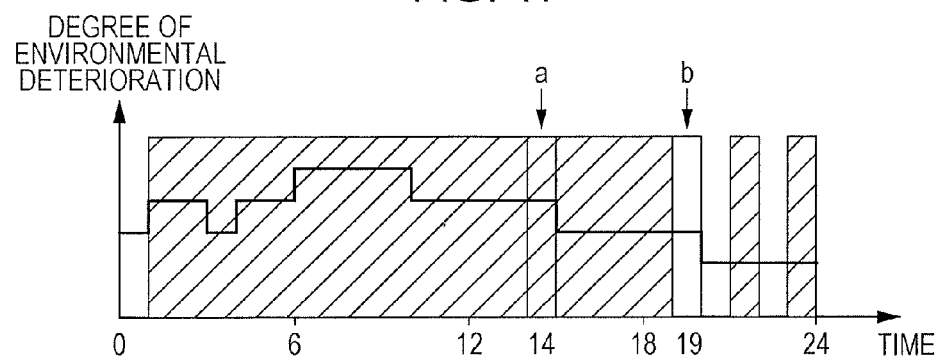
FIG. 17 is a diagram used to explain calculation of an amount of downtime.

FIG. 17 illustrates both the degree of environmental deterioration and update inappropriateness time frames. The horizontal axis represents time, the vertical axis represents degree of environmental deterioration, and hatched time frames represent update inappropriateness time frames. In the case where the printer 14 enters its idle state in a printing operation at 2:00 p.m. (a time frame denoted by "a" in FIG. 17), the user sends a command to perform an update for the printer 14.

However, since this time frame is an update inappropriateness time frame, no update is basically performed. Here, in the case where the user has input through the input unit 122 data indicating that an update is allowed to be performed even in an update inappropriateness time frame, the controller 12 calculates an amount of downtime D. That is, an update appropriateness time period Tgood is acquired, which is a time period right after the time frame "a" for which the user has allowed an update to be performed. In FIG. 17, since an update inappropriateness time frame is from 1:00 a.m. to 6:00 p.m., an update appropriateness time frame right after the update inappropriateness time frame is 7:00 p.m. (a time frame denoted by "b" in FIG. 17). The controller 12 calculates a degree of environmental deterioration for the time frame denoted by "a", a degree of environmental deterioration for the time frame denoted by "b", and the difference between these degrees of environmental deterioration, and outputs the difference as an amount of downtime D to the monitor 121. By seeing the amount of downtime D on the monitor 121, the user may determine quantitatively the loss caused when an update is performed in the update inappropriateness time frame (the time frame denoted by "a" in FIG. 17) and may acquire information to make a determination as to whether or not an update should be performed in the time frame.

Figure 18A:
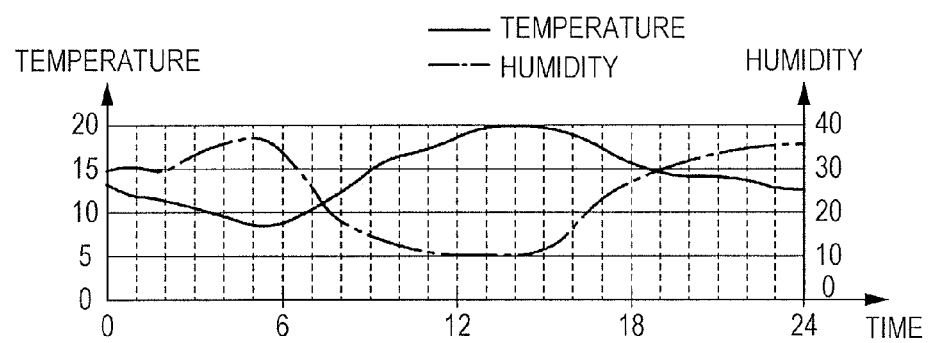
FIGS. 18A to 18B are graphs illustrating another example of an environment change history and another example of a degree-of-environmental-deterioration history.
Figure 18B:
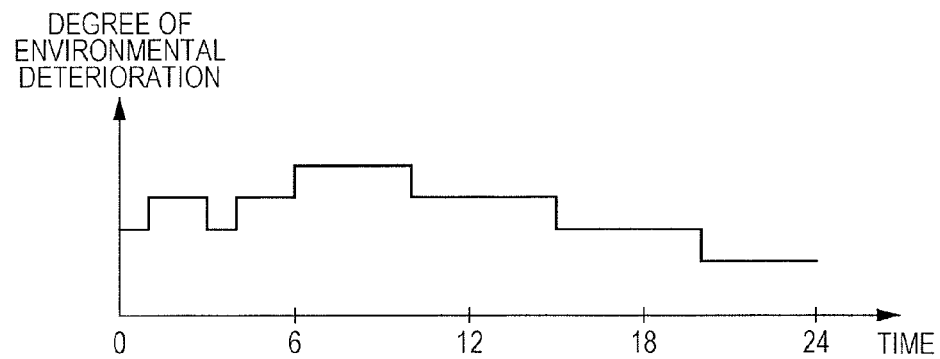

FIGS. 18A to 18B are another example of an environment change history and another example of a degree-of-environmental-deterioration history, respectively. FIG. 18A is a temperature-and-humidity change history. The horizontal axis represents time, the left vertical axis represents temperature, and the right vertical axis represents humidity. FIG. 18B illustrates a degree-of-environmental-deterioration history. The horizontal axis represents time and the vertical axis represents the degree of deterioration, which is converted into a numerical value in accordance with a certain standard.

Figure 19A:
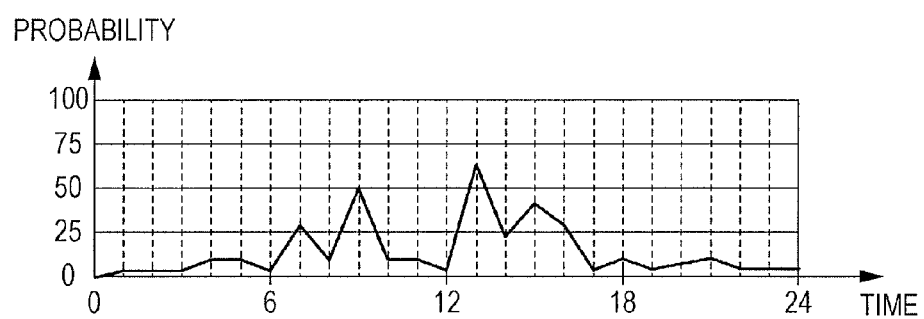
FIGS. 19A to 19B are graphs illustrating an example of an instantaneous interruption history and an example of an operation history.
Figure 19B:
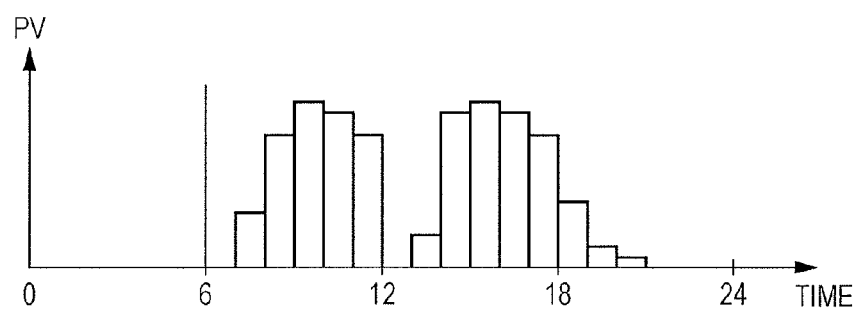

FIGS. 19A and 19B are an example of an instantaneous interruption history and an example of an amount-of-operation history, respectively. FIG. 19A illustrates instantaneous interruptions. The horizontal axis represents time and the vertical axis represents the probability of an instantaneous interruption. FIG. 19B illustrates the amount of operation. The horizontal axis represents time and the vertical axis represents PV. FIG. 19B illustrates the case where an operation status changes greatly.

FIG. 20 illustrates an update inappropriateness index in every unit time of a certain specific day for which FIGS. 18A to 19B are taken into consideration. In FIG. 20, both PV serving as an amount of operation and a temperature and a humidity serving as a degree of environmental deterioration are converted into numerical values and illustrated. Furthermore, the probability of an instantaneous interruption is converted into a numerical value and is illustrated. The higher the probability of an instantaneous interruption, the greater the numerical value for the instantaneous interruption. An update inappropriateness index is calculated such that the greater the amount of operation or the greater the degree of environmental deterioration, the greater the probability of an instantaneous interruption.

For example, an update inappropriateness index is defined as

Update Inappropriateness Index=PV Index+Temperature Index+Humidity Index+Instantaneous Interruption Index.

In accordance with this expression, since PV=0, Temperature=3, Humidity=1, and Instantaneous Interruption=0 at 12:00 midnight, Update Inappropriateness Index=4 is obtained. Likewise, since PV=5, Temperature=2, Humidity=4, and Instantaneous Interruption=8 at 9:00 a.m., Update Inappropriateness Index=19 is obtained. In FIG. 20, when a certain threshold is, for example, "5", a time frame having an update inappropriateness index of 6 or greater is set as an update inappropriateness time frame, and a time frame from 6:00 a.m. to 11:00 a.m. and a time frame from 1:00 p.m. to 6:00 p.m. are set as update inappropriateness time frames. An instantaneous interruption may also be determined as one parameter of the degree of environmental deterioration.

The exemplary embodiment of the present invention has been described above; however, the present invention is not limited to the exemplary embodiment and many various modifications are possible.

For example, the management server 16 calculates an update inappropriateness time frame in the exemplary embodiment. In contrast, the management server 16 may also calculate an update appropriateness time frame. An update inappropriateness time frame and an update appropriateness time frame are closely associated with each other, and it may be said that calculation of an update inappropriateness time frame is practically the same as calculation of an update appropriateness time frame. In order to calculate an update appropriateness time frame, for example, a time frame having a score lower than the threshold for inappropriateness has only to be extracted in S505 of the flowchart of FIG. 8.

In addition, the exemplary embodiment provides a configuration with which, in the case where the user sends a command to perform an update in an update inappropriateness time frame, an amount of downtime D is calculated with respect to the next update appropriateness time frame, the calculated amount of downtime D is displayed on the monitor 121, and the user may make a determination by seeing the amount of downtime D displayed on the monitor 121; however, the update may also be automatically performed in the next update appropriateness time frame without calculating the amount of downtime D. Alternatively, the exemplary embodiment may also provide a configuration with which an amount of downtime D is compared with a certain threshold, and in the case where the amount of downtime D is less than or equal to the certain threshold and there is no large difference in terms of amount of downtime D compared with the case where an update is performed in the next update appropriateness time frame, the update is performed in the time frame specified by the user.

In addition, in the exemplary embodiment, an amount of downtime D is calculated using the difference between a degree of environmental deterioration of an update inappropriateness time frame and a degree of environmental deterioration of an update appropriateness time frame; however, instead of the difference, an amount of downtime D may also be calculated using a degree of environmental deterioration and an amount of operation of an update inappropriateness time frame and a degree of environmental deterioration and an amount of operation of an update appropriateness time frame. When a description is made with reference to the drawings, for example, calculation may be performed from $$\text{Amount of Downtime } D = UNC\text{now} \times T - UNC\text{good} \times T$$

using an update inappropriateness index in an update inappropriateness time frame and an update inappropriateness index in an update appropriateness time frame illustrated in FIG. 13. Here, UNCnow and UNCgood denote an update inappropriateness index in an update inappropriateness time frame and an update inappropriateness index in an update appropriateness time frame, respectively, and T denotes an estimated time period for performing an update.

In addition, in the exemplary embodiment, the controller 12 outputs information indicating an update inappropriateness time frame determined by the management server 16 to the monitor 121 and notifies the user of the update inappropriateness time frame; however, without notifying the user of an update inappropriateness time frame, the controller 12 may also determine whether or not a time frame specified by the user for performing an update is an update inappropriateness time frame and in the case where the specified time frame is an update inappropriateness time frame, the controller 12 may also output, to the monitor 121, a message indicating that the specified time frame is an update inappropriateness time frame.

In addition, in the exemplary embodiment, the management server 16 calculates an update inappropriateness time frame in accordance with an operation history and an environment change history stored in the operation history memory 163 and the environment change history memory 164; however, since the controller 12 also includes the operation history memory 1206 and the environment change history memory 1207, an update inappropriateness time frame may also be calculated in the controller 12 in accordance with these histories. In short, an update inappropriateness time frame has only to be calculated either by the controller 12 or the management server 16. Likewise, in the exemplary embodiment, the management server 16 calculates an estimated time period for performing an update; however, an estimated time period for performing an update may also be calculated in the controller 12 in accordance with an update module and an update history.

In a system of the exemplary embodiment, examples of possible combinations are as follows.

<Pattern 1>

The management server 16 calculates an estimated time period for performing an update and sets an update inappropriateness (or appropriateness) time period.

The controller 12 performs execution control for an update module in accordance with the update inappropriateness (or appropriateness) time period and calculates an amount of downtime D.

<Pattern 2>

The controller 12 calculates an estimated time period for performing an update, sets an update inappropriateness (or appropriateness) time period, performs execution control for an update module in accordance with the update inappropriateness (or appropriateness) time period, and calculates an amount of downtime D.

<Pattern 3>

The management server 16 calculates an estimated time period for performing an update, sets an update inappropriateness (or appropriateness) time period, determines whether or not to execute an update module in accordance with the update inappropriateness (or appropriateness) time period, and calculates an amount of downtime D.

The controller 12 performs execution control for an update module in accordance with a determination as to whether or not the update module is to be executed. The exemplary embodiment of the present invention does not exclude any of these patterns. Note that the controller 12 according to the exemplary embodiment functions as an image forming apparatus as described above; however, since the management server 16 manages an operation of the controller 12 and (indirectly) controls a printing operation of the printer 14, the management server 16 may also function as an image forming apparatus similarly to the controller 12. Thus, in the exemplary embodiment, "image forming apparatuses" include not only the controller 12 but also the management server 16.

In addition, in the exemplary embodiment, examples of environment parameters include temperature and humidity and furthermore the presence or absence of an instantaneous interruption; however, an amount of dust may also be used in addition to these parameters. In this case, an update inappropriateness index has only to be calculated such that the greater the amount of dust, the greater the update inappropriateness index.

In addition, in the exemplary embodiment, a degree of environmental deterioration may also be calculated only in accordance with humidity in the case where the temperature is almost constant, only in accordance with temperature in the case where the humidity is almost constant, and only in accordance with the presence or absence of an instantaneous interruption in the case where the temperature and the humidity are almost constant. A degree of environmental deterioration may be adaptively calculated in accordance with a country or a region where the printer 14 is installed. That is, a degree of environmental deterioration has only to be calculated in accordance with at least any of temperature, humidity, an amount of dust, and the presence or absence of an instantaneous interruption such that the lower the temperature is, the lower the humidity is, the greater the amount of dust is, or the more number of times an instantaneous interruption occurs, the greater the degree of environmental deterioration.

Furthermore, in the exemplary embodiment, an example of an update target is a printer, especially an ink-jet printer. However, the exemplary embodiment is not limited to this, and may also be applied to an arbitrary device (a multifunction machine, a copier, a scanner, or the like) that may not keep an internal environment in a desirable state when an update is performed and whose performance may be affected by an external environment.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   at least one processor configured to execute:
      an operation estimation unit configured to estimate an amount of operation from an operation history of an apparatus;
      a calculation unit configured to calculate a degree of environmental deterioration of an internal environment of the apparatus caused when a firmware update is performed for the apparatus, the degree of environmental deterioration being calculated in accordance with at least one from among temperature, humidity, and an amount of dust; and
      a control unit configured to set an inappropriate time frame or an appropriate time frame for the update using the amount of operation and the degree of environmental deterioration, and update firmware of the apparatus according to the set inappropriate time frame or the set appropriate time frame.

2. The image forming apparatus according to claim 1, wherein the at least one processor is further configured to execute:
an update time period estimation unit configured to estimate an update time period to be required for performing the update,
wherein the amount-of-downtime calculation unit is configured to perform calculation in accordance with the update time period.

3. The image forming apparatus according to claim 2, wherein the update time period estimation unit is configured to perform the estimation in accordance with a time period required for rebooting the apparatus after the update has been performed.

4. The image forming apparatus according to claim 1, wherein the degree of environmental deterioration is calculated such that the lower the temperature is, the lower the humidity is, or the greater the amount of dust is, the greater the degree of environmental deterioration is.

5. The image forming apparatus according to claim 1, wherein the degree of environmental deterioration is calculated such that the lower the temperature is, the lower the humidity is, or the greater the amount of dust is, the greater the degree of environmental deterioration is.

6. The image forming apparatus according to claim 2, wherein the degree of environmental deterioration is calculated such that the lower the temperature is, the lower the humidity is, or the greater the amount of dust is, the greater the degree of environmental deterioration is.

7. The image forming apparatus according to claim 3, wherein the degree of environmental deterioration is calculated such that the lower the temperature is, the lower the humidity is, or the greater the amount of dust is, the greater the degree of environmental deterioration is.

8. An image forming system comprising:
a controller, comprised of a CPU and memory, configured to control an apparatus; and
a management server computer configured to be connected to the controller via a network, wherein
any of the controller and the management server computer includes:
an operation estimation unit configured to estimate an amount of operation from an operation history of the apparatus,
a calculation unit configured to calculate a degree of environmental deterioration of an internal environment of the apparatus caused when a firmware update is performed for the apparatus,
a control unit configured to set an inappropriate time frame or an appropriate time frame for the update using the amount of operation and the degree of environmental deterioration, the degree of environmental deterioration being calculated in accordance with at least one from among temperature, humidity, and an amount of dust, and
an update control unit configured to control performance of an update for the apparatus in accordance with a specified update time and either the inappropriate time frame or the appropriate time frame, and update firmware of the apparatus according to the set inappropriate time frame or the set appropriate time frame.

9. The image forming system according to claim 8, wherein any of the controller and the management server computer further includes an amount-of-downtime calculation unit configured to calculate an amount of downtime in a case where the update is allowed to be performed in the inappropriate time frame for the update, the amount of downtime being a difference between a time period for performing the update in the inappropriate time frame and a time period for performing the update in the appropriate time frame.

10. An image forming method comprising:
estimating an amount of operation from an operation history of an apparatus;
calculating a degree of environmental deterioration of an internal environment of the apparatus caused when a firmware update is performed for the apparatus, the degree of environmental deterioration being calculated in accordance with at least one from among temperature, humidity, and an amount of dust;
setting an inappropriate time frame or an appropriate time frame for the update using the amount of operation and the degree of environmental deterioration; and
updating firmware of the apparatus according to the set inappropriate time frame or the set appropriate time frame.

11. The image forming method according to claim 10, further comprising:
calculating an amount of downtime in a case where the update is allowed to be performed in the inappropriate time frame for the update, the amount of downtime being a difference between a time period for performing the update in the inappropriate time frame and a time period for performing the update in the appropriate time frame.

* * * * *